United States Patent
Rosenberg et al.

(10) Patent No.: US 11,636,351 B2
(45) Date of Patent: *Apr. 25, 2023

(54) AMPLIFYING GROUP INTELLIGENCE BY ADAPTIVE POPULATION OPTIMIZATION

(71) Applicant: UNANIMOUS A. I., INC., San Francisco, CA (US)

(72) Inventors: Louis B. Rosenberg, San Luis Obispo, CA (US); Gregg Willcox, San Luis Obispo, CA (US)

(73) Assignee: Unanimous A. I., Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,972

(22) Filed: Apr. 22, 2021

(65) Prior Publication Data

US 2021/0241127 A1 Aug. 5, 2021

Related U.S. Application Data

(63) Continuation of application No. 16/059,698, filed on Aug. 9, 2018, now Pat. No. 11,151,460, which is a (Continued)

(51) Int. Cl.
*G06F 16/25* (2019.01)
*G06N 5/022* (2023.01)
(Continued)

(52) U.S. Cl.
CPC ............. *G06N 5/022* (2013.01); *G06F 16/95* (2019.01); *G06F 17/18* (2013.01); *G06N 3/006* (2013.01);
(Continued)

(58) Field of Classification Search
CPC .......... G06N 20/00; G06N 5/022; G06N 5/02; G06F 16/903; G06F 16/9538; G06F 8/65;
(Continued)

(56) References Cited

U.S. PATENT DOCUMENTS 5,236,199 A 8/1993 Thompson, Jr.
5,400,248 A 3/1995 Chisholm
(Continued)

FOREIGN PATENT DOCUMENTS

CA 2414397 8/2003
EP 3123442 2/2017
(Continued)

OTHER PUBLICATIONS

"Dialogr—A simple tool for collective thinking"; Mar. 25, 2015; http://www.dialogr.com/.; 1 page.
(Continued)

*Primary Examiner* — Tony Mahmoudi
*Assistant Examiner* — Linh Black
(74) *Attorney, Agent, or Firm* — Fitch, Even, Tabin & Flannery LLP

(57) ABSTRACT

System and method for amplifying the accuracy of forecasts generated by software systems that harness the collective intelligence of human populations by curating optimized sub-populations through an intelligent selection process. Participants predict event outcomes and/or provide evaluations of their confidence in their predictions. The system determines a score wherein the alignment score indicates how well that participant's prediction aligns with the predictions given by the baseline population. Participants can then be selected from the population based on the participant alignment scores.

18 Claims, 10 Drawing Sheets

Related U.S. Application Data continuation-in-part of application No. 15/959,080, filed on Apr. 20, 2018, now Pat. No. 10,606,464, which is a continuation of application No. 15/936,324, filed on Mar. 26, 2018, now Pat. No. 10,599,315, which is a continuation of application No. 14/668,970, filed on Mar. 25, 2015, now Pat. No. 9,959,028, said application No. 16/059,698 is a continuation-in-part of application No. 15/922,453, filed on Mar. 15, 2018, now abandoned, and a continuation-in-part of application No. 15/910,934, filed on Mar. 2, 2018, now Pat. No. 10,606,463, and a continuation-in-part of application No. 15/904,239, filed on Feb. 23, 2018, now Pat. No. 10,416,666, and a continuation-in-part of application No. 15/898,468, filed on Feb. 17, 2018, now Pat. No. 10,712,929, and a continuation-in-part of application No. 15/815,579, filed on Nov. 16, 2017, now Pat. No. 10,439,836, and a continuation-in-part of application No. PCT/US2017/062095, filed on Nov. 16, 2017, and a continuation-in-part of application No. PCT/US2017/040480, filed on Jun. 30, 2017, and a continuation-in-part of application No. 15/640,145, filed on Jun. 30, 2017, now Pat. No. 10,353,551, and a continuation-in-part of application No. 15/241,340, filed on Aug. 19, 2016, now Pat. No. 10,222,961, and a continuation-in-part of application No. 15/199,990, filed on Jul. 1, 2016, now abandoned, and a continuation-in-part of application No. PCT/US2016/040600, filed on Jul. 1, 2016, and a continuation-in-part of application No. 15/086,034, filed on Mar. 30, 2016, now Pat. No. 10,310,802, and a continuation-in-part of application No. 15/052,876, filed on Feb. 25, 2016, now Pat. No. 10,110,664, and a continuation-in-part of application No. 15/047,522, filed on Feb. 18, 2016, now Pat. No. 10,133,460, and a continuation-in-part of application No. 15/017,424, filed on Feb. 5, 2016, now abandoned, and a continuation-in-part of application No. 14/925,837, filed on Oct. 28, 2015, now Pat. No. 10,551,999, and a continuation-in-part of application No. 14/920,819, filed on Oct. 22, 2015, now Pat. No. 10,277,645, and a continuation-in-part of application No. 14/859,035, filed on Sep. 18, 2015, now Pat. No. 10,122,775, and a continuation-in-part of application No. 14/708,038, filed on May 8, 2015, now abandoned, said application No. 15/910,934 is a continuation of application No. 14/738,768, filed on Jun. 12, 2015, now Pat. No. 9,940,006.

(60) Provisional application No. 62/552,968, filed on Aug. 31, 2017, provisional application No. 62/544,861, filed on Aug. 13, 2017, provisional application No. 62/473,424, filed on Mar. 19, 2017, provisional application No. 62/473,442, filed on Mar. 19, 2017, provisional application No. 62/473,429, filed on Mar. 19, 2017, provisional application No. 62/463,657, filed on Feb. 26, 2017, provisional application No. 62/460,861, filed on Feb. 19, 2017, provisional application No. 62/423,402, filed on Nov. 17, 2016, provisional application No. 62/358,026, filed on Jul. 3, 2016, provisional application No. 62/207,234, filed on Aug. 19, 2015, provisional application No. 62/187,470, filed on Jul. 1, 2015, provisional application No. 62/140,032, filed on Mar. 30, 2015, provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
*G06N 5/04* (2023.01)
*G06F 17/18* (2006.01)
*G06N 20/00* (2019.01)
*G06F 16/95* (2019.01)
*G06N 3/006* (2023.01)
*G06N 20/10* (2019.01)

(52) U.S. Cl.
CPC .............. *G06N 5/041* (2013.01); *G06N 20/00* (2019.01); *G06N 20/10* (2019.01)

(58) Field of Classification Search
CPC .. G06F 16/338; G06F 16/35; G06F 16/24578; G06F 16/248; G06F 16/367; G06F 40/30; G06F 16/43; G16H 50/70
USPC ....... 707/603, 727, 749–750, 759, 766, 778, 707/781, 786, E17.048, E17.102
See application file for complete search history.

(56) References Cited

U.S. PATENT DOCUMENTS

| | | | | |
|---|---|---|---|---|
| 5,808,908 | A | 9/1998 | Ghahramani | |
| 5,867,799 | A | 2/1999 | Lang | |
| 6,064,978 | A | 5/2000 | Gardner | |
| 6,480,210 | B1 | 11/2002 | Martino | |
| 6,792,399 | B1 | 9/2004 | Phillips | |
| 6,903,723 | B1 | 6/2005 | Forest | |
| 6,944,596 | B1 | 9/2005 | Gray | |
| 7,031,842 | B1 | 4/2006 | Musat | |
| 7,155,510 | B1 | 12/2006 | Kaplan | |
| 7,158,112 | B2 | 1/2007 | Rosenberg | |
| 7,451,213 | B2 | 11/2008 | Kaplan | |
| 7,489,979 | B2 | 2/2009 | Rosenberg | |
| 7,542,816 | B2 | 6/2009 | Rosenberg | |
| 7,562,117 | B2 | 7/2009 | Rosenberg | |
| 7,603,414 | B2 | 10/2009 | Rosenberg | |
| 7,624,077 | B2 | 11/2009 | Bonabeau | |
| 7,831,928 | B1 | 11/2010 | Rose | |
| 7,856,602 | B2 | 12/2010 | Armstrong | |
| 7,917,148 | B2 | 3/2011 | Rosenberg | |
| 7,937,285 | B2 | 5/2011 | Goldberg | |
| 8,176,101 | B2 | 5/2012 | Rosenberg | |
| 8,209,250 | B2 | 6/2012 | Bradway | |
| 8,250,071 | B1 | 8/2012 | Killalea | |
| 8,255,393 | B1 * | 8/2012 | Yu | H04W 4/029 707/724 |
| 8,341,065 | B2 | 12/2012 | Berg | |
| 8,527,523 | B1 * | 9/2013 | Ravid | G06F 16/93 706/54 |
| 8,583,470 | B1 | 11/2013 | Fine | |
| 8,589,488 | B2 | 11/2013 | Huston | |
| 8,655,804 | B2 | 2/2014 | Carrabis | |
| 8,660,972 | B1 | 2/2014 | Heidenreich | |
| 8,676,735 | B1 | 3/2014 | Heidenreich | |
| 8,706,742 | B1 * | 4/2014 | Ravid | G06N 5/04 707/740 |
| 8,745,104 | B1 | 6/2014 | Rosenberg | |
| 8,762,435 | B1 | 6/2014 | Rosenberg | |
| 9,483,161 | B2 | 11/2016 | Wenger | |

(56) References Cited

U.S. PATENT DOCUMENTS

| | | |
|---|---|---|
| 9,710,836 B1 | 7/2017 | O'Malley |
| 9,940,006 B2 | 4/2018 | Rosenberg |
| 9,959,028 B2 | 5/2018 | Rosenberg |
| 10,110,664 B2 | 10/2018 | Rosenberg |
| 10,122,775 B2 | 11/2018 | Rosenberg |
| 10,133,460 B2 | 11/2018 | Rosenberg |
| 10,222,961 B2 | 3/2019 | Rosenberg |
| 10,277,645 B2 | 4/2019 | Rosenberg |
| 10,310,802 B2 | 6/2019 | Rosenberg |
| 10,332,412 B2 | 6/2019 | Swank |
| 10,353,551 B2 | 7/2019 | Rosenberg |
| 10,416,666 B2 | 9/2019 | Rosenberg |
| 10,439,836 B2 | 10/2019 | Rosenberg |
| 10,551,999 B2 | 2/2020 | Rosenberg |
| 10,599,315 B2 | 3/2020 | Rosenberg |
| 10,606,463 B2 | 3/2020 | Rosenberg |
| 10,606,464 B2 | 3/2020 | Rosenberg |
| 10,609,124 B2 | 3/2020 | Rosenberg |
| 10,656,807 B2 | 5/2020 | Rosenberg |
| 10,712,929 B2 | 7/2020 | Rosenberg |
| 10,817,158 B2 | 10/2020 | Rosenberg |
| 10,817,159 B2 | 10/2020 | Willcox |
| 10,992,700 B2 * | 4/2021 | Stolarz ................ H04K 1/00 |
| 11,151,460 B2 | 10/2021 | Rosenberg |
| 11,269,502 B2 | 3/2022 | Rosenberg |
| 11,360,655 B2 | 6/2022 | Willcox |
| 11,360,656 B2 | 6/2022 | Rosenberg |
| 2001/0042010 A1 | 11/2001 | Hassell |
| 2002/0042920 A1 | 4/2002 | Thomas |
| 2002/0107726 A1 | 8/2002 | Torrance |
| 2002/0129106 A1 | 9/2002 | Gutfreund |
| 2002/0171690 A1 | 11/2002 | Fox |
| 2003/0023685 A1 | 1/2003 | Cousins |
| 2003/0033193 A1 | 2/2003 | Holloway |
| 2003/0065604 A1 | 4/2003 | Gatto |
| 2003/0079218 A1 | 4/2003 | Goldberg |
| 2003/0088458 A1 | 5/2003 | Afeyan |
| 2003/0210227 A1 | 11/2003 | Smith |
| 2003/0227479 A1 | 12/2003 | Mizrahi |
| 2004/0015429 A1 | 1/2004 | Tighe |
| 2004/0210550 A1 | 10/2004 | Williams |
| 2005/0067493 A1 | 3/2005 | Urken |
| 2005/0075919 A1 | 4/2005 | Kim |
| 2005/0168489 A1 | 8/2005 | Ausbeck |
| 2005/0218601 A1 | 10/2005 | Capellan |
| 2005/0261953 A1 | 11/2005 | Malek |
| 2006/0010057 A1 | 1/2006 | Bradway |
| 2006/0147890 A1 | 7/2006 | Bradford |
| 2006/0200401 A1 | 9/2006 | Lisani |
| 2006/0204945 A1 | 9/2006 | Masuichi |
| 2006/0218179 A1 | 9/2006 | Gardner |
| 2006/0250357 A1 | 11/2006 | Safai |
| 2007/0011073 A1 | 1/2007 | Gardner |
| 2007/0039031 A1 | 2/2007 | Cansler, Jr. |
| 2007/0055610 A1 | 3/2007 | Palestrant |
| 2007/0067211 A1 | 3/2007 | Kaplan |
| 2007/0072156 A1 | 3/2007 | Kaufman |
| 2007/0078977 A1 | 4/2007 | Kaplan |
| 2007/0097150 A1 | 5/2007 | Ivashin |
| 2007/0099162 A1 | 5/2007 | Sekhar |
| 2007/0121843 A1 | 5/2007 | Atazky |
| 2007/0124503 A1 | 5/2007 | Ramos |
| 2007/0207479 A1 * | 9/2007 | Wong ............... G01N 33/57407 435/6.14 |
| 2007/0208727 A1 | 9/2007 | Saklikar |
| 2007/0209069 A1 | 9/2007 | Saklikar |
| 2007/0211050 A1 | 9/2007 | Ohta |
| 2007/0216712 A1 | 9/2007 | Louch |
| 2007/0220100 A1 | 9/2007 | Rosenberg |
| 2007/0226296 A1 | 9/2007 | Lowrance |
| 2007/0294067 A1 | 12/2007 | West |
| 2008/0003559 A1 | 1/2008 | Toyama |
| 2008/0015115 A1 | 1/2008 | Guyot-Sionnest |
| 2008/0016463 A1 | 1/2008 | Marsden |
| 2008/0091777 A1 | 4/2008 | Carlos |
| 2008/0103877 A1 | 5/2008 | Gerken |
| 2008/0140477 A1 | 6/2008 | Tevanian |
| 2008/0140688 A1 | 6/2008 | Clayton |
| 2008/0189634 A1 | 8/2008 | Tevanian |
| 2008/0195459 A1 | 8/2008 | Stinski |
| 2009/0037355 A1 | 2/2009 | Brave |
| 2009/0063379 A1 | 3/2009 | Kelly |
| 2009/0063463 A1 | 3/2009 | Turner |
| 2009/0063991 A1 | 3/2009 | Baron |
| 2009/0063995 A1 | 3/2009 | Baron |
| 2009/0073174 A1 | 3/2009 | Berg |
| 2009/0076939 A1 | 3/2009 | Berg |
| 2009/0076974 A1 | 3/2009 | Berg |
| 2009/0125821 A1 | 5/2009 | Johnson |
| 2009/0239205 A1 | 9/2009 | Morgia |
| 2009/0254425 A1 | 10/2009 | Horowitz |
| 2009/0254836 A1 | 10/2009 | Bajrach |
| 2009/0287685 A1 | 11/2009 | Charnock |
| 2009/0325533 A1 | 12/2009 | Lele |
| 2010/0023857 A1 | 1/2010 | Mahesh |
| 2010/0100204 A1 | 4/2010 | Ng |
| 2010/0144426 A1 | 6/2010 | Winner |
| 2010/0145715 A1 | 6/2010 | Cohen |
| 2010/0169144 A1 | 7/2010 | Estill |
| 2010/0174579 A1 | 7/2010 | Hughes |
| 2010/0199191 A1 | 8/2010 | Takahashi |
| 2010/0205541 A1 | 8/2010 | Rapaport |
| 2010/0299616 A1 | 11/2010 | Chen |
| 2011/0016137 A1 | 1/2011 | Goroshevsky |
| 2011/0080341 A1 | 4/2011 | Helmes |
| 2011/0087687 A1 | 4/2011 | Immaneni |
| 2011/0119048 A1 | 5/2011 | Shaw |
| 2011/0141027 A1 | 6/2011 | Ghassabian |
| 2011/0166916 A1 | 7/2011 | Inbar |
| 2011/0208328 A1 | 8/2011 | Cairns |
| 2011/0208684 A1 | 8/2011 | Dube |
| 2011/0208822 A1 | 8/2011 | Rathod |
| 2011/0276396 A1 | 11/2011 | Rathod |
| 2011/0288919 A1 | 11/2011 | Gross |
| 2011/0320536 A1 | 12/2011 | Lobb |
| 2012/0005131 A1 | 1/2012 | Horvitz |
| 2012/0011006 A1 | 1/2012 | Schultz |
| 2012/0013489 A1 | 1/2012 | Earl |
| 2012/0072843 A1 | 3/2012 | Durham |
| 2012/0079396 A1 | 3/2012 | Neer |
| 2012/0088220 A1 | 4/2012 | Feng |
| 2012/0088222 A1 | 4/2012 | Considine |
| 2012/0101933 A1 | 4/2012 | Hanson |
| 2012/0109883 A1 | 5/2012 | Iordanov |
| 2012/0110087 A1 | 5/2012 | Culver |
| 2012/0179567 A1 | 7/2012 | Soroca |
| 2012/0191774 A1 | 7/2012 | Bhaskaran |
| 2012/0290950 A1 | 11/2012 | Rapaport |
| 2012/0316962 A1 | 12/2012 | Rathod |
| 2013/0013248 A1 | 1/2013 | Brugler |
| 2013/0019205 A1 | 1/2013 | Gil |
| 2013/0035989 A1 | 2/2013 | Brown |
| 2013/0041720 A1 | 2/2013 | Spires |
| 2013/0097245 A1 | 4/2013 | Adarraga |
| 2013/0103692 A1 | 4/2013 | Raza |
| 2013/0132284 A1 | 5/2013 | Convertino |
| 2013/0150253 A1 * | 6/2013 | Deciu ................ C12Q 1/6883 506/2 |
| 2013/0160142 A1 | 6/2013 | Lai |
| 2013/0171594 A1 | 7/2013 | Gorman |
| 2013/0184039 A1 | 7/2013 | Steir |
| 2013/0191181 A1 | 7/2013 | Balestrieri |
| 2013/0191390 A1 | 7/2013 | Engel |
| 2013/0203506 A1 | 8/2013 | Brown |
| 2013/0231595 A1 | 9/2013 | Zoss |
| 2013/0254146 A1 * | 9/2013 | Ellis ................ G06Q 30/0202 706/46 |
| 2013/0298690 A1 | 11/2013 | Bond |
| 2013/0300740 A1 | 11/2013 | Snyder |
| 2013/0310260 A1 * | 11/2013 | Kim ................ G16B 30/20 702/19 |
| 2013/0311904 A1 | 11/2013 | Tien |
| 2013/0339445 A1 | 12/2013 | Perincherry |

(56) References Cited

U.S. PATENT DOCUMENTS

| | | |
|---|---|---|
| 2014/0006042 A1* | 1/2014 | Keefe .................. G16H 10/20 705/2 |
| 2014/0012780 A1 | 1/2014 | Sanders |
| 2014/0047356 A1 | 2/2014 | Ameller-Van-Baumberghen |
| 2014/0057240 A1 | 2/2014 | Colby |
| 2014/0074751 A1 | 3/2014 | Rocklitz |
| 2014/0075004 A1 | 3/2014 | Van Dusen |
| 2014/0089233 A1 | 3/2014 | Ellis |
| 2014/0089521 A1 | 3/2014 | Horowitz |
| 2014/0100924 A1 | 4/2014 | Ingenito |
| 2014/0108915 A1 | 4/2014 | Lu |
| 2014/0128162 A1 | 5/2014 | Arafat |
| 2014/0129946 A1 | 5/2014 | Harris |
| 2014/0162241 A1 | 6/2014 | Morgia |
| 2014/0171039 A1 | 6/2014 | Bjontegard |
| 2014/0214831 A1 | 7/2014 | Chi |
| 2014/0249689 A1 | 9/2014 | Bienkowski |
| 2014/0249889 A1 | 9/2014 | Park |
| 2014/0258970 A1 | 9/2014 | Brown |
| 2014/0278835 A1 | 9/2014 | Moseson |
| 2014/0279625 A1 | 9/2014 | Carter |
| 2014/0282586 A1 | 9/2014 | Shear |
| 2014/0310607 A1 | 10/2014 | Abraham |
| 2014/0316616 A1 | 10/2014 | Kugelmass |
| 2014/0337097 A1 | 11/2014 | Farlie |
| 2014/0351719 A1 | 11/2014 | Cattermole |
| 2014/0358825 A1 | 12/2014 | Phillipps |
| 2014/0379439 A1 | 12/2014 | Sekhar |
| 2015/0006492 A1 | 1/2015 | Wexler |
| 2015/0065214 A1 | 3/2015 | Olson |
| 2015/0089399 A1 | 3/2015 | Megill |
| 2015/0120619 A1 | 4/2015 | Baughman |
| 2015/0149932 A1 | 5/2015 | Yamada |
| 2015/0154557 A1 | 6/2015 | Skaaksrud |
| 2015/0156233 A1 | 6/2015 | Bergo |
| 2015/0170050 A1 | 6/2015 | Price |
| 2015/0192437 A1 | 7/2015 | Bouzas |
| 2015/0236866 A1 | 8/2015 | Colby |
| 2015/0242755 A1 | 8/2015 | Gross |
| 2015/0242972 A1 | 8/2015 | Lemmey |
| 2015/0248817 A1 | 9/2015 | Steir |
| 2015/0262208 A1 | 9/2015 | Bjontegard |
| 2015/0302308 A1 | 10/2015 | Bartek |
| 2015/0310687 A1 | 10/2015 | Morgia |
| 2015/0326625 A1 | 11/2015 | Rosenberg |
| 2015/0331601 A1 | 11/2015 | Rosenberg |
| 2015/0339020 A1 | 11/2015 | D Amore |
| 2015/0347903 A1 | 12/2015 | Saxena |
| 2016/0034305 A1 | 2/2016 | Shear |
| 2016/0044073 A1 | 2/2016 | Rosenberg |
| 2016/0048274 A1 | 2/2016 | Rosenberg |
| 2016/0055236 A1 | 2/2016 | Frank |
| 2016/0057182 A1 | 2/2016 | Rosenberg |
| 2016/0062735 A1 | 3/2016 | Wilber |
| 2016/0078458 A1 | 3/2016 | Gold |
| 2016/0082348 A1 | 3/2016 | Kehoe |
| 2016/0092989 A1 | 3/2016 | Marsh |
| 2016/0098778 A1 | 4/2016 | Blumenthal |
| 2016/0154570 A1 | 6/2016 | Rosenberg |
| 2016/0170594 A1 | 6/2016 | Rosenberg |
| 2016/0170616 A1 | 6/2016 | Rosenberg |
| 2016/0189025 A1 | 6/2016 | Hayes |
| 2016/0209992 A1 | 7/2016 | Rosenberg |
| 2016/0210602 A1 | 7/2016 | Siddique |
| 2016/0274779 A9 | 9/2016 | Rosenberg |
| 2016/0277457 A9 | 9/2016 | Rosenberg |
| 2016/0284172 A1 | 9/2016 | Weast |
| 2016/0314527 A1 | 10/2016 | Rosenberg |
| 2016/0320956 A9 | 11/2016 | Rosenberg |
| 2016/0335647 A1 | 11/2016 | Rebrovick |
| 2016/0349976 A1 | 12/2016 | Lauer |
| 2016/0357418 A1 | 12/2016 | Rosenberg |
| 2016/0366200 A1 | 12/2016 | Healy |
| 2017/0083974 A1 | 3/2017 | Guillen |
| 2017/0091633 A1 | 3/2017 | Vemula |
| 2017/0223411 A1 | 8/2017 | De Juan |
| 2017/0300198 A1 | 10/2017 | Rosenberg |
| 2018/0076968 A1 | 3/2018 | Rosenberg |
| 2018/0181117 A1 | 6/2018 | Rosenberg |
| 2018/0196593 A1 | 7/2018 | Rosenberg |
| 2018/0203580 A1 | 7/2018 | Rosenberg |
| 2018/0204184 A1 | 7/2018 | Rosenberg |
| 2018/0217745 A1 | 8/2018 | Rosenberg |
| 2018/0239523 A1 | 8/2018 | Rosenberg |
| 2018/0373991 A1 | 12/2018 | Rosenberg |
| 2018/0375676 A1 | 12/2018 | Bader-Natal |
| 2019/0006048 A1* | 1/2019 | Gupta .................... G16H 20/10 |
| 2019/0014170 A1 | 1/2019 | Rosenberg |
| 2019/0034063 A1 | 1/2019 | Rosenberg |
| 2019/0042081 A1 | 2/2019 | Rosenberg |
| 2019/0066133 A1 | 2/2019 | Cotton |
| 2019/0121529 A1 | 4/2019 | Rosenberg |
| 2019/0212908 A1 | 7/2019 | Willcox |
| 2020/0005341 A1 | 1/2020 | Marsh |
| 2020/0019893 A1* | 1/2020 | Lu ......................... G06N 20/00 |
| 2020/0250380 A1* | 8/2020 | Wang .................... G06N 20/10 |
| 2021/0004149 A1 | 1/2021 | Willcox |
| 2021/0004150 A1 | 1/2021 | Rosenberg |
| 2021/0209554 A1 | 7/2021 | Hill |
| 2021/0241127 A1 | 8/2021 | Rosenberg |
| 2022/0276774 A1 | 9/2022 | Rosenberg |
| 2022/0276775 A1 | 9/2022 | Willcox |

FOREIGN PATENT DOCUMENTS

| | | |
|---|---|---|
| EP | 3155584 | 4/2017 |
| EP | 3210386 | 8/2017 |
| GB | 2561458 | 10/2018 |
| JP | 2010191533 | 9/2010 |
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |
| WO | 2015148738 | 10/2015 |
| WO | 2015195492 | 12/2015 |
| WO | 2016064827 | 4/2016 |
| WO | 2017004475 | 1/2017 |
| WO | 2018006065 | 1/2018 |
| WO | 2018094105 | 5/2018 |

OTHER PUBLICATIONS

Beni; "From Swarm Intelligence to Swarm Robotics"; Swarm Robotics WS 2004, LNCS 3342; pp. 1-9; 2005.

Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.

Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.

Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.

Deck et al; "Prediction Markets in the Laboratory"; University of Arkansas and Chapman University; J. Econ. Surv., 2013; 33 pages.

Deneubourg et al; "Collective Patterns and Decision-Making"; Ethology Ecology & Evolution; Mar. 22, 1989; pp. 295-311.

Ding et al.; "Time Weight Collaborative Filtering"; CIKM'05, Oct. 31-Nov. 5, 2005; Bremen, Germany; pp. 485-492.

EP; Extended European Search Report for EP Application No. 15767909.3 mailed from the European Patent Office dated Sep. 4, 2017.

EP; Extended European Search Report for EP Application No. 15808982.1 mailed from the European Patent Office dated Nov. 28, 2017.

EP; Extended European Search Report for EP Application No. 15852495.9 mailed from the European Patent Office dated Mar. 21, 2018.

(56) References Cited

OTHER PUBLICATIONS

Examination Report for Indian Patent Application No. 201747000968 mailed from the Indian Patent Office dated Nov. 4, 2020.
Examination Report under Section 18(3) for GB1805236.5 mailed from the Intellectual Property Office dated Apr. 1, 2021.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
PCT; International Search Report and Written Opinion of the International Searching Authority for PCT/US2017/062095 dated May 23, 2018.
Puleston et al.; "Predicting the Future: Primary Research Exploring the Science of Prediction"; Copyright Esomar 2014; 31 pages; (Year: 2014).
Quora; "What are Some Open Source Prediction Market Systems?"; retrieved from https://www.quora.com/What-are-some-Open-Source-Prediction-Market-systems; on Mar. 19, 2020 (Year: 2016).
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; U.S. Appl. No. 17/024,580, filed Sep. 17, 2020.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=EuRyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
Rosenberg; U.S. Appl. No. 16/059,698, filed Aug. 9, 2018.
Rosenberg; U.S. Appl. No. 16/154,613 filed Oct. 8, 2018.
Rosenberg; U.S. Appl. No. 15/959,080, filed Apr. 20, 2018.
Salminen; "Collective Intelligence in Humans: A Literature Review"; Lappeenranta University of Technology, Lahti School of Innovation; 1Proceedings; 2012; 8 pages.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Unanimous A. I.; "What is Swarm Intelligence"; 2015; http://unu.ai/swarm-intelligence/; downloaded Oct. 6, 2016; 3 pages.
USPTO; Examiner Interview Summary for U.S. Appl. No. 15/086,034 dated Feb. 13, 2019.
USPTO; Examiner Interview Summary for U.S. Appl. No. 15/086,034 dated Jan. 9, 2019.
USPTO; Examiner Interview Summary for U.S. Appl. No. 16/059,698 dated Feb. 2, 2021.
USPTO; Final Office Action for U.S. Appl. No. 14/925,837 dated Aug. 7, 2019.
USPTO; Final Office Action for U.S. Appl. No. 15/086,034 dated Jul. 17, 2018.
USPTO; Final Office Action for U.S. Appl. No. 16/059,698 dated Dec. 31, 2020.

(56) References Cited

OTHER PUBLICATIONS

USPTO; Non-Final Office Action for U.S. Appl. No. 14/738,768 dated Sep. 8, 2017.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 14/920,819 dated Jun. 27, 2018.
USPTO; Non-Final Office Action for U.S. Appl. No. 14/925,837 dated Apr. 3, 2018.
USPTO; Non-Final Office Action for U.S. Appl. No. 15/017,424 dated Apr. 2, 2019.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 15/199,990 dated Sep. 25, 2019.
USPTO; Non-Final Office Action for U.S. Appl. No. 15/241,340 dated Jul. 19, 2018.
USPTO; Non-Final Office Action for U.S. Appl. No. 15/898,468 dated Mar. 3, 2020.
USPTO; Non-Final Office Action for U.S. Appl. No. 15/910,934 dated Oct. 16, 2019.
USPTO; Non-Final Office Action for U.S. Appl. No. 15/922,453 dated Dec. 23, 2019.
USPTO; Non-Final Office Action for U.S. Appl. No. 15/936,324 dated Oct. 21, 2019.
USPTO; Non-Final Office Action for U.S. Appl. No. 15/959,080 dated Nov. 7, 2019.
USPTO; Non-Final Office Action for U.S. Appl. No. 16/059,698 dated Jun. 8, 2020.
USPTO; Non-Final Office Action for U.S. Appl. No. 16/130,990 dated Oct. 21, 2019.
USPTO; Non-Final Office Action for U.S. Appl. No. 16/147,647 dated Jan. 27, 2020.
USPTO; Non-Final Office Action for U.S. Appl. No. 16/230,759 dated Mar. 26, 2020.
USPTO; Non-Final Office Action for U.S. Appl. No. 16/668,970 dated Aug. 15, 2017.
USPTO; Notice of Allowance for U.S. Appl. No. 16/130,990 dated Jan. 21, 2020.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 14/925,837 dated Nov. 7, 2019.
USPTO; Notice of Allowance for U.S. Appl. No. 15/959,080 dated Jan. 31, 2020.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/086,034 dated Mar. 5, 2019.
USPTO; Notice of Allowance for U.S. Appl. No. 15/241,340 dated Nov. 20, 2018.
USPTO; Notice of Allowance for U.S. Appl. No. 15/640,145 dated May 23, 2019.
USPTO; Notice of Allowance for U.S. Appl. No. 15/640,145 dated Nov. 15, 2018.
USPTO; Notice of Allowance for U.S. Appl. No. 15/815,579 dated Jul. 31, 2019.
USPTO; Notice of Allowance for U.S. Appl. No. 15/898,468 dated May 1, 2020.
USPTO; Notice of Allowance for U.S. Appl. No. 15/910,934 dated Jan. 15, 2020.
USPTO; Notice of Allowance for U.S. Appl. No. 15/936,324 dated Dec. 9, 2019.
USPTO; Notice of Allowance for U.S. Appl. No. 16/059,698 dated Mar. 15, 2021.
USPTO; Notice of Allowance for U.S. Appl. No. 16/147,647 dated Mar. 18, 2020.
USPTO; Notice of Allowance for U.S. Appl. No. 16/230,759 dated Jul. 17, 2020.
USPTO; Notice of Allowance for U.S. Appl. No. 16/356,777 dated Jul. 22, 2020.
USPTO; Notice of Allowance for U.S. Appl. No. 16/904,239 dated Jun. 17, 2019.
USPTO; Office Action for U.S. Appl. No. 14/708,038 dated Apr. 23, 2019.
USPTO; Restriction Requirement for U.S. Appl. No. 15/017,424 dated Oct. 2, 2018.
USPTO; Restriction Requirement for U.S. Appl. No. 15/199,990 dated Aug. 1, 2019.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Willcox; U.S. Appl. No. 16/356,777, filed Mar. 18, 2019.
Willcox; U.S. Appl. No. 17/024,474, filed Sep. 17, 2020.
Yeung et al.; "Metacognition in human decision-making: confidence and error monitoring"; Philosophical Transactions of the Royal Society B; 2012; pp. 1310-1321.
Atanasov et al; "Distilling the Wisdom of Crowds: Prediction Markets vs. Prediction Polls"; Managament Science, Articles in Advance; pp. 1-16; http://dx.doi.org/10.1287/mnsc.2015.2374; 2016 INFORMS (Year 2016).
Combined Search and Examination Report under Sections 17 & 18(3) for GB2202778.3 issued by the GB Intellectual Property Office dated Mar. 10, 2022.
Examination Report under Section 18(3) for GB1805236.5 mailed from the Intellectual Property Office dated Jul. 30, 2021.
Examination Report under Section 18(3) for GB1805236.5 mailed from the Intellectual Property Office dated Mar. 24, 2022.
Gurcay et al.; "The Power of Social Influence on Estimation Accuracy"; Journal of Behavioral Decision Making; J. Behav. Dec. Making (2014); Published online in Wiley Online Library (wileyonlinelibrary.com); DOI:10.1002/bdm.1843; 12 pages (Year: 2014).
Mathematics Libre Texts; "3.3: Power Functions and Polynomial Functions"; Accessed on Oct. 8, 2021 at https://math.libretexts.org/Bookshelves/Precalculus/Precalculus_(OpenStax)/03%3A_Polynomial_and_Rational_Functions/3.03%3A_Power_Functions_and_Polynomial_Functions (Year:2021); 12 pages.
Rosenberg; U.S. Appl. No. 17/581,769, filed Jan. 21, 2022.
Rosenberg; U.S. Appl. No. 17/744,464, filed May 13, 2022.
Search and Examination Report under Sections 17 & 18(3) for Application No. GB1805236.5 issued by the UK Intellectual Property Office dated Jan. 28, 2022.
Search Report under Section 17 for GB2202778.3 issued by the GB Intellectual Property Office dated Mar. 4, 2022.
Transforming Relationships; "Lottery: A tax on the statistically-challenged."; Chapter 4, Sec 4.1; Accessed on Oct. 8, 2021 at http://www.henry.k12.ga.us/ugh/apstat/chaptemotes/sec4.1.html (Year:2021); 3 pages.
USPTO; Non-Final Office Action for U.S. Appl. No. 17/024,474 dated Oct. 12, 2021.
USPTO; Non-Final Office Action for U.S. Appl. No. 17/024,580 dated Nov. 23, 2021.
USPTO; Non-Final Office Action for U.S. Appl. No. 16/154,613 dated Aug. 20, 2021.
USPTO; Notice of Allowance for U.S. Appl. No. 16/154,613 dated Nov. 3, 2021.

(56) References Cited

OTHER PUBLICATIONS

USPTO; Notice of Allowance for U.S. Appl. No. 17/024,580 dated Apr. 12, 2022.
USPTO: Notice of Allowance issued in U.S. Appl. No. 17/024,474 dated Apr. 11, 2022.
Willcox; U.S. Appl. No. 17/744,479, filed May 13, 2022.

* cited by examiner

1. Which team will win tonight, Cubs or Cardinals? Answer: [ ] CUBS or [ ] CARDINALS
2. What is your confidence level? ANSWER: 0 to 100%
3. What percentage of other participants answered the same as you? ANSWER: 0 to 100%
4. How much should we wager on this game? ANSWER: $0 to $100

5. Which team will win tonight, Braves or Mets? Answer: [ ] BRAVES or [ ] METS
6. What is your confidence level? ANSWER: 0 to 100%
7. What percentage of other participants answered the same as you? ANSWER: 0 to 100%
8. How much should we wager on this game? ANSWER: $0 to $100

9. Which team will win tonight, Nationals or Marlins? Answer: [ ] NATIONALS or [ ] MARLINS
10. What is your confidence level? ANSWER: 0 to 100%
11. What percentage of other participants answered the same as you? ANSWER: 0 to 100%
12. How much should we wager on this game? ANSWER: $0 to $100

13. Which team will win tonight, Pirates or Red Socks? Answer: [ ] PIRATES or [ ] RED SOCKS
14. What is your confidence level? ANSWER: 0 to 100%
15. What percentage of other participants answered the same as you? ANSWER: 0 to 100%
16. How much should we wager on this game? ANSWER: $0 to $100

17. Which team will win tonight, Royals or Twins? Answer: [ ] ROYALS or [ ] TWINS
18. What is your confidence level? ANSWER: 0 to 100%
19. What percentage of other participants answered the same as you? ANSWER: 0 to 100%
20. How much should we wager on this game? ANSWER: $0 to $100

21. What Percentage of the five game outcomes above do you think you prediected correctly? ANSWER: 0% to 100%

22. What Percentage of the five game outcome above do you think the group, on average predicted correctly? ANSWER: 0% to 100%
23. How knowledgeable do you consider yourself with respect to Major League Baseball? ANSWER: 0 to 100

24. How knowledgeable is the average participant with respect to Major League baseball? ANSWER: 0 to 100

FIG. 6

AMPLIFYING GROUP INTELLIGENCE BY ADAPTIVE POPULATION OPTIMIZATION

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which in turn claims the benefit of U.S. Provisional Application No. 62/544,861 entitled ADAPTIVE OUTLIER ANALYSIS FOR AMPLIFYING THE INTELLIGENCE OF CROWDS AND SWARMS, filed Aug. 13, 2017, both of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which in turn claims the benefit of U.S. Provisional Application No. 62/552,968 entitled SYSTEM AND METHOD FOR OPTIMIZING THE POPULATION USED BY CROWDS AND SWARMS FOR AMPLIFIED EMERGENT INTELLIGENCE, filed Aug. 31, 2017, both of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/959,080, filed Apr. 20, 2018 entitled METHODS AND SYSTEMS FOR GAZE ENABLED COLLABORATIVE INTELLIGENCE, now U.S. Pat. No. 10,606,464, which is a continuation of U.S. application Ser. No. 15/936,324, filed Mar. 26, 2018, entitled METHODS AND SYSTEMS FOR REAL-TIME CLOSED-LOOP COLLABORATIVE INTELLIGENCE, now U.S. Pat. No. 10,599,315, which is a continuation of U.S. application Ser. No. 14/668,970 entitled METHODS AND SYSTEMS FOR REAL-TIME CLOSED-LOOP COLLABORATIVE INTELLIGENCE, filed Mar. 25, 2015, now U.S. Pat. No. 9,959,028, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/910,934, for INTUITIVE INTERFACES FOR REAL-TIME COLLABORATIVE INTELLIGENCE, filed Mar. 2, 2018, now U.S. Pat. No. 10,606,463, which is a continuation of U.S. application Ser. No. 14/738,768 entitled INTUITIVE INTERFACES FOR REAL-TIME COLLABORATIVE INTELLIGENCE, filed Jun. 12, 2015, now U.S. Pat. No. 9,940,006, which in turn claims the benefit of U.S. Provisional Application 62/012,403 entitled INTUITIVE INTERFACE FOR REAL-TIME COLLABORATIVE CONTROL, filed Jun. 15, 2014, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015, now U.S. Pat. No. 10,122,775, which in turn claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015, now U.S. Pat. No. 10,277,645, which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015, now U.S. Pat. No. 10,551,999, which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/047,522 entitled SYSTEMS AND METHODS FOR COLLAB- ORATIVE SYNCHRONOUS IMAGE SELECTION, filed Feb. 18, 2016, now U.S. Pat. No. 10,133,460, which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/052,876 entitled DYNAMIC SYSTEMS FOR OPTIMIZATION OF REAL-TIME COLLABORATIVE INTELLIGENCE, filed Feb. 25, 2016, now U.S. Pat. No. 10,110,664, which in turn claims the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016, now U.S. Pat. No. 10,310,802, which in turn claims the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, which in turn claims the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/241,340 entitled METHODS FOR ANALYZING DECISIONS MADE BY REAL-TIME INTELLIGENCE SYSTEMS, filed Aug. 19, 2016, now U.S. Pat. No. 10,222,961, which in turn claims the benefit of U.S. Provisional Application No. 62/207,234 entitled METHODS FOR ANALYZING THE DECISIONS MADE BY REAL-TIME COLLECTIVE INTELLIGENCE SYSTEMS filed Aug. 19, 2015, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/640,145 entitled METHODS AND SYSTEMS FOR MODIFYING USER INFLUENCE DURING A COLLABORATIVE SESSION OF REAL-TIME COLLABORATIVE INTELLIGENCE SYSTEM, filed Jun. 30, 2017, now U.S. Pat. No. 10,353,551, which in turn claims the benefit of U.S. Provisional Application No. 62/358,026 entitled METHODS AND SYSTEMS FOR AMPLIFYING THE INTELLIGENCE OF A HUMAN-BASED ARTIFICIAL SWARM INTELLIGENCE filed Jul. 3, 2016, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/815,579 entitled SYSTEMS AND METHODS FOR HYBRID SWARM INTELLIGENCE, filed Nov. 16, 2017, now U.S. Pat. No. 10,439,836, which in turn claims the benefit of U.S. Provisional Application No. 62/423,402 entitled SYSTEM AND METHOD FOR HYBRID SWARM INTELLIGENCE filed Nov. 17, 2016, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/898,468 entitled ADAPTIVE CONFIDENCE CALIBRATION FOR REAL-TIME SWARM INTELLIGENCE SYSTEMS, filed Feb. 17, 2018, now U.S. Pat. No. 10,712,929, which in turn claims the benefit of U.S. Provisional Application No. 62/460,861 entitled ARTIFICIAL SWARM INTELLIGENCE WITH ADAPTIVE CONFIDENCE CALIBRATION, filed Feb. 19, 2017 and also claims the benefit of U.S. Provisional Application No. 62/473,442 entitled ARTIFICIAL SWARM INTELLIGENCE WITH ADAPTIVE CONFIDENCE CALIBRATION, filed Mar. 19, 2017, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/904,239 entitled METHODS AND SYSTEMS FOR COLLABORATIVE CONTROL OF A REMOTE VEHICLE, filed Feb. 23, 2018, now U.S. Pat. No. 10,416,666, which in turn claims the benefit of U.S. Provisional Application No. 62/463,657 entitled METHODS AND SYSTEMS FOR COLLABORATIVE CONTROL OF A ROBOTIC MOBILE FIRST-PERSON STREAMING CAMERA SOURCE, filed Feb. 26, 2017 and also claims the benefit of U.S. Provisional Application No. 62/473,429 entitled METHODS AND SYSTEMS FOR COLLABORATIVE CONTROL OF A ROBOTIC MOBILE FIRST-PERSON STREAMING CAMERA SOURCE, filed Mar. 19, 2017, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of U.S. application Ser. No. 15/922,453 entitled PARALLELIZED SUB-FACTOR AGGREGATION IN REAL-TIME SWARM-BASED COLLECTIVE INTELLIGENCE SYSTEMS, filed Mar. 15, 2018, which in turn claims the benefit of U.S. Provisional Application No.

62/473,424 entitled PARALLELIZED SUB-FACTOR AGGREGATION IN A REAL-TIME COLLABORATIVE INTELLIGENCE SYSTEMS filed Mar. 19, 2017, all of which are incorporated in their entirety herein by reference.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of International Application No. PCT/US16/40600, filed Jul. 1, 2016.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of International Application No. PCT/US17/40480, filed Jun. 30, 2017.

This application is a continuation of U.S. application Ser. No. 16/059,698, filed Aug. 9, 2018, for ADAPTIVE POPULATION OPTIMIZATION FOR AMPLIFYING THE INTELLIGENCE OF CROWDS AND SWARMS, which is a continuation-in-part of International Application No. PCT/US17/62095, filed Nov. 16, 2017.

BACKGROUND OF THE INVENTION

1. Field of the Invention

The present invention relates generally to systems and methods for real-time swarm-based collective intelligence, and more specifically to systems and methods for selection of users for real-time closed-loop dynamic collaborative control systems.

2. Discussion of the Related Art

The aggregation of insights collected from groups of people has been shown to amplify intelligence in certain situations. Sometimes called the Wisdom of Crowds, these methods generally use statistical averaging across a static set of data collected from a population. Artificial Swarm Intelligence is an alternate approach modeled after natural swarms. It enables populations to aggregate their insights as real-time systems, with feedback loops, that converge on optimal solutions. For both crowd-based and swarm-based methods, it's generally the case the population of participants include a wide range of knowledge levels and/or skill levels such that some participants provide more insightful input than others with respect to the problem at hand. Historical performance data for participants is one way that the members of a population can distinguished as more or less insightful. But what if there is little or no historical information regarding the insightfulness of participants?

What is needed is inventive systems and methods for enabling the probabilistic identification of insightful performer versus un-insightful performers within a population based only in their input data, without any historical data regarding the accuracy of their insights on similar prior tasks, and for amplifying the intelligence of crowds (i.e. statistical averages of a population) and/or swarms (i.e. real-time systems created across a population) to enable more accurate predictions, forecasts, estimations, assessments, and other insights.

SUMMARY OF THE INVENTION

Several embodiments of the invention advantageously address the needs above as well as other needs by providing a system for curating an optimized population of human forecasting participants from a baseline population of human forecasting participants based on an algorithmic analysis of prediction data collected from each participant, the analysis identifying the likelihood that each participant will be a high-performer in a prediction task involving one or more future events, the system comprising: a processing device including a processor and configured for network communication; a plurality of application instances wherein each application instance is configured to query a participant, receive input from the queried participant about the prediction task, and be in network communication with the processing device regarding the prediction task, wherein the system is configured to perform the steps of: query each member of the baseline population of participants about the prediction task comprised of predicting a set of events, wherein each event has a set of possible outcomes including at least two possible outcomes; collect a set of predictions from each participant, each participant interacting with one application instance, wherein each set of predictions includes a predicted outcome for each event of the set of events; for each event in the set of events, compute one or more support values wherein each support value for each event represents the percentage of participants in the baseline population that predicted a particular outcome within the set of possible outcomes; for each participant, compute an outlier score for each event, wherein the outlier score is computed by algorithmically comparing the participant's predicted outcome for that event to the support value for that outcome of that event, wherein the outlier score indicates how well that participant's prediction aligns with the predictions given by the baseline population; for each participant, determine an outlier index based on the plurality of outlier scores computed for that participant for the set of events, the outlier index indicating how well the set of predictions provided by that participant aligned with the sets of predictions given by the baseline population; curating an optimized population from the baseline population based at least in part upon a plurality of the outlier indexes, the curation process including at least one selected from the group of (a) culling a plurality of participants from the baseline population in response to the outlier index of each culled participant indicating low alignment compared to other participants, and (b) generating a weighting value for a set of participants in the baseline population, the generated weighting values being lower for participants with an outlier index indicating low alignment as compared to weighting values for participants with an outlier index indicating high alignment; and using curated population information to generate at least one crowd-based or swarm-based prediction for a future event having at least two outcomes.

In another embodiment, the invention can be characterized as A method for curating an optimized population of human forecasting participants from a baseline population of human forecasting participants based on an algorithmic analysis of prediction data collected from each participant, the analysis identifying the likelihood that each participant will be a high-performer in a prediction task involving one or more future events, comprising the steps of: querying, by a processing device including a processor and configured for networked communication, each member of the baseline population of participants about the prediction task comprised of predicting a set of events, wherein each event has a set of possible outcomes including at least two possible outcomes; collecting, by a plurality of application instances, wherein each application instance receives input from one participant and is in networked communication with the processing device, a set of predictions from each participant, each participant interacting with one application instance, wherein each set of predictions includes a predicted outcome for each event of the set of events; computing, by the processor for each event in the set of events, one or more support values wherein each support value for each event represents the percentage of participants in the baseline population that predicted a particular outcome within the set of possible outcomes; computing, by the processor for each participant, an outlier score for each event, wherein the outlier score is computed by algorithmically comparing the participant's predicted outcome for that event to the support value for that outcome of that event, wherein the outlier score indicates how well that participant's prediction aligns with the predictions given by the baseline population; and determining, by the processor for each participant, an outlier index based on the plurality of outlier scores computed for that participant for the set of events, the outlier index indicating how well the set of predictions provided by that participant aligned with the sets of predictions given by the baseline population; curating, by the processor, an optimized population from the baseline population based at least in part upon a plurality of the outlier indexes, the curation process including at least one selected from the group of (a) culling a plurality of participants from the baseline population in response to the outlier index of each culled participant indicating low alignment compared to other participants, and (b) generating a weighting value for a set of participants in the baseline population, the generated weighting values being lower for participants with an outlier index indicating low alignment as compared to weighting values for participants with an outlier index indicating high alignment; and using, by the processor, of curated population information to generate at least one crowd-based or swarm-based prediction for a future event having at least two outcomes.

BRIEF DESCRIPTION OF THE DRAWINGS

The above and other aspects, features and advantages of several embodiments of the present invention will be more apparent from the following more particular description thereof, presented in conjunction with the following drawings.

FIG. 6 is an exemplary set of question configured for use in embodiments of the Adaptive Outlier Analysis of the present invention

Figure 1:
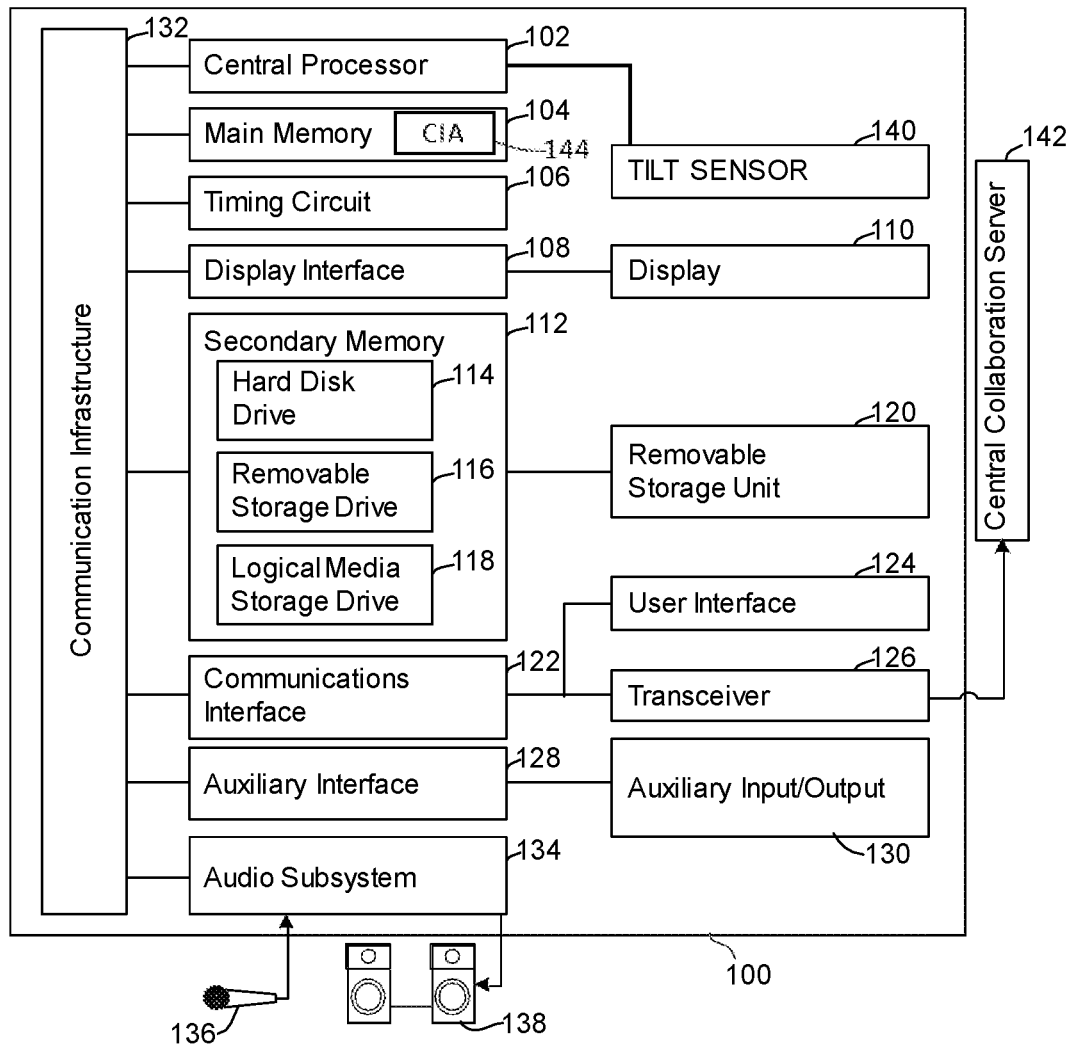
FIG. 1 is a schematic diagram of an exemplary computing device configured for use in a collaboration system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Real-time occurrences as referenced herein are those that are substantially current within the context of human perception and reaction.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Historical research demonstrates that the insights generated by groups can be more accurate than the insights generated by individuals in many situations. A classic example is estimating the number of beans in a jar. Many researchers have shown that taking the statistical average of estimates made by many individuals will yield an answer that is more accurate than the typical member of the population queried. When the individuals provide their input as isolated data points, to be aggregated statistically, the process is often referred to as "crowdsourcing". When the individuals form a real-time system and provide their input together, with feedback loops enabling the group to converge on a solution in synchrony, the process is often referred to as "swarming". While very different entities, crowds and swarms both share one characteristic—a more insightful population will produce more accurate insights. Thus there is a significant need for both crowdsourcing and swarming to identify a sub-population of highly insightful performers from a larger population of general participants.

To put this in context—groups can make predictions about future events such as sporting matches by forming crowds or swarms. When crowdsourcing, the process will take the statistical average of predictions made by a population of individuals in isolation. The group predictions are often mildly more accurate than the individual predictions. Swarming methods don't use statistical averages of data, but instead form real-time systems that enable the population of participants to work together in real time, with feedback loops that enable them to converge together on optimized predictions. Such systems have been shown to significantly outperform crowds. The one thing that crowds and swarms have in common is that a population of individuals with more insight about a topic generally produces better predictions of outcomes. The present invention is aimed at crafting a more insightful population by identifying lower-insight participants without having historical information about how those participants perform in prior prediction tasks. By identifying lower performers (and/or by ranking lower vs higher insight performers) the present invention aims to use this analysis to increase the accuracy of both crowd-based and swarm-based predictions, forecasts, and assessments.

Collaborative Intelligence Systems and Methods

Systems and methods for collaborative swarm intelligence are disclosed in the related applications.

As described in related U.S. Pat. No. 9,959,028 for METHODS AND SYSTEMS FOR REAL-TIME CLOSED-LOOP COLLABORATIVE INTELLIGENCE, by the present inventor, and incorporated by reference, a swarm-based system and methods have been developed that enable groups of users to collaboratively control the motion of a graphical pointer through a unique real-time closed-loop control paradigm. In some embodiments, the collaboratively controlled pointer is configured to empower a group of users to choose letters, words, numbers, phrases, and/or other choices in response to a prompt posed simultaneously to the group. This enables the formation a group response that's not based on the will of any individual user, but rather on the collective will of the group. In this way, the system disclosed herein enables a group of people to express insights as a unified intelligence, thereby making decisions, answering questions, rendering forecasts, and making predictions as an artificial swarm intelligence.

As described in U.S. patent application Ser. No. 14/708, 038 for MULTI-GROUP METHODS AND SYSTEMS FOR REAL-TIME MULTI-TIER COLLABORATIVE INTELLIGENCE, by the current inventor and incorporated by reference, additional systems and methods have been disclosed that encourage groups of real-time users who are answering questions as a swarm to produce coherent responses while discouraging incoherent responses. A number of methods were disclosed therein, including (a) Coherence Scoring, (b) Coherence Feedback, and (c) Tiered Processing. These and other techniques greatly enhance the effectiveness of the resulting intelligence.

As described in U.S. patent application Ser. No. 14/859, 035 for SYSTEMS AND METHODS FOR ASSESSMENT AND OPTIMIZATION OF REAL-TIME COLLABORATIVE INTELLIGENCE SYSTEMS, by the present inventor and incorporated by reference, a system and methods have been developed for enabling artificial swarms to modify its participant population dynamically over time, optimizing the performance of the emergent intelligence by altering its population makeup and/or the altering the relative influence of members of within that population. In some such embodiments the members of a swarm can selectively eject one or more low performing members of that swarm (from the swarm), using the group-wise collaborative decision-making techniques herein. As also disclosed, swarms can be configured to dynamically adjust its own makeup, not by ejecting members of the swarm but by adjusting the relative weighting of the input received from members of the swarm. More specifically, in some embodiments, algorithms are used to increase the impact (weighting) that some users have upon the closed-loop motion of the pointer, while decreasing the impact (weighting that other users have upon the closed-loop motion of the pointer. In this way, the swarm intelligence is adapted over time by the underlying algorithms disclosed herein, strengthening the connections (i.e. input) with respect to the more collaborative users, and weakening the connections with respect to the less collaborative users.

Referring first to FIG. 1, as previously disclosed in the related patent applications, a schematic diagram of an exemplary portable computing device 100 configured for use in the collaboration system is shown. Shown are a central processor 102, a main memory 104, a timing circuit 106, a display interface 108, a display 110, a secondary memory subsystem 112, a hard disk drive 114, a removable storage drive 116, a logical media storage drive 118, a removable storage unit 120, a communications interface 122, a user interface 124, a transceiver 126, an auxiliary interface 128, an auxiliary I/O port 130, communications infrastructure 132, an audio subsystem 134, a microphone 136, headphones 138, a tilt sensor 140, a central collaboration server 142, and a collaborative intent application 144.

Each of a plurality of portable computing devices 100, each used by one of a plurality of users (the plurality of users also referred to as a group), is networked in real-time to the central collaboration server (CCS) 142. In some embodiments, one of the portable computing devices 100 could act as the central collaboration server 142. For the purposes of this disclosure, the central collaboration server 142 is its own computer system in a remote location, and not the portable computing device 100 of one of the users. Hence the collaboration system is comprised of the centralized central collaboration server 142 and the plurality of portable computing devices 100, each of the portable computing devices 100 used by one user.

The portable computing device 100 may be embodied as a handheld unit, a pocket housed unit, a body worn unit, or other portable unit that is generally maintained on the person of a user. The portable computing device 100 may be wearable, such as transmissive display glasses.

The central processor 102 is provided to interpret and execute logical instructions stored in the main memory 104. The main memory 104 is the primary general purpose storage area for instructions and data to be processed by the central processor 102. The main memory 104 is used in the broadest sense and may include RAM, EEPROM and ROM. The timing circuit 106 is provided to coordinate activities within the portable computing device 100. The central processor 102, main memory 104 and timing circuit 106 are directly coupled to the communications infrastructure 132. The central processor 102 may be configured to run a variety of applications, including for example phone and address book applications, media storage and play applications, gaming applications, clock and timing applications, phone and email and text messaging and chat and other communication applications. The central processor 102 is also configured to run at least one Collaborative Intent Application (CIA) 144. The Collaborative Intent Application 144 may be a standalone application or may be a component of an application that also runs upon other networked processors.

The portable computing device 100 includes the communications infrastructure 132 used to transfer data, memory addresses where data items are to be found and control signals among the various components and subsystems of the portable computing device 100.

The display interface 108 is provided upon the portable computing device 100 to drive the display 110 associated with the portable computing device 100. The display interface 108 is electrically coupled to the communications infrastructure 132 and provides signals to the display 110 for visually outputting both graphics and alphanumeric characters. The display interface 108 may include a dedicated graphics processor and memory to support the displaying of graphics intensive media. The display 110 may be of any type (e.g., cathode ray tube, gas plasma) but in most circumstances will usually be a solid state device such as liquid crystal display. The display 110 may include a touch screen capability, allowing manual input as well as graphical display.

Affixed to the display 110, directly or indirectly, is the tilt sensor 140 (accelerometer or other effective technology) that detects the physical orientation of the display 110. The tilt sensor 140 is also coupled to the central processor 102 so that input conveyed via the tilt sensor 140 is transferred to the central processor 102. The tilt sensor 140 provides input to the Collaborative Intent Application 144, as described later. Other input methods may include eye tracking, voice input, and/or manipulandum input.

The secondary memory subsystem 112 is provided which houses retrievable storage units such as the hard disk drive 114 and the removable storage drive 116. Optional storage units such as the logical media storage drive 118 and the removable storage unit 118 may also be included. The removable storage drive 116 may be a replaceable hard drive, optical media storage drive or a solid state flash RAM device. The logical media storage drive 118 may be a flash RAM device, EEPROM encoded with playable media, or optical storage media (CD, DVD). The removable storage unit 120 may be logical, optical or of an electromechanical (hard disk) design.

The communications interface 122 subsystem is provided which allows for standardized electrical connection of peripheral devices to the communications infrastructure 132 including, serial, parallel, USB, and Firewire connectivity. For example, the user interface 124 and the transceiver 126 are electrically coupled to the communications infrastructure 132 via the communications interface 122. For purposes of this disclosure, the term user interface 124 includes the hardware and operating software by which the user executes procedures on the portable computing device 100 and the means by which the portable computing device 100 conveys information to the user. In the present invention, the user interface 124 is controlled by the CIA 144 and is configured to display information regarding the group collaboration, as well as receive user input and display group output.

To accommodate non-standardized communications interfaces (i.e., proprietary), the optional separate auxiliary interface 128 and the auxiliary I/O port 130 are provided to couple proprietary peripheral devices to the communications infrastructure 132. The transceiver 126 facilitates the remote exchange of data and synchronizing signals between the portable computing device 100 and the Central Collaboration Server 142. The transceiver 126 could also be used to enable communication among a plurality of portable computing devices 100 used by other participants. In some embodiments, one of the portable computing devices 100 acts as the Central Collaboration Server 142, although the ideal embodiment uses a dedicated server for this purpose. In one embodiment the transceiver 126 is a radio frequency type normally associated with computer networks for example, wireless computer networks based on BlueTooth® or the various IEEE standards 802.11.sub.x., where x denotes the various present and evolving wireless computing standards. In some embodiments the portable computing devices 100 establish an ad hock network between and among them, as with a BlueTooth® communication technology.

It should be noted that any prevailing wireless communication standard may be employed to enable the plurality of portable computing devices 100 to exchange data and thereby engage in a collaborative consciousness process. For example, digital cellular communications formats compatible with for example GSM, 3G, 4G, and evolving cellular communications standards. Both peer-to-peer (PPP) and client-server models are envisioned for implementation of the invention. In a third alternative embodiment, the transceiver 126 may include hybrids of computer communications standards, cellular standards and evolving satellite radio standards.

The audio subsystem 134 is provided and electrically coupled to the communications infrastructure 132. The audio subsystem 134 is configured for the playback and recording of digital media, for example, multi or multimedia encoded in any of the exemplary formats MP3, AVI, WAV, MPG, QT, WMA, AIFF, AU, RAM, RA, MOV, MIDI, etc.

The audio subsystem 134 in one embodiment includes the microphone 136 which is used for the detection and capture of vocal utterances from that unit's user. In this way the user may issue a suggestion as a verbal utterance. The portable computing device 100 may then capture the verbal utterance, digitize the utterance, and convey the utterance to other of said plurality of users by sending it to their respective portable computing devices 100 over the intervening network. In this way, the user may convey a suggestion verbally and have the suggestion conveyed as verbal audio content to other users. It should be noted that if the users are in close physical proximity the suggestion may be conveyed verbally without the need for conveying it through an electronic media. The user may simply speak the suggestion to the other members of the group who are in close listening range. Those users may then accept or reject the suggestion using their portable electronic devices 100 and taking advantage of the tallying, processing, and electronic decision determination and communication processes disclosed herein. In this way the present invention may act as a supportive supplement that is seamlessly integrated into a direct face to face conversation held among a group of users.

For embodiments that do include the microphone 136, it may be incorporated within the casing of the portable computing device 100 or may be remotely located elsewhere upon a body of the user and is connected to the portable computing device 100 by a wired or wireless link. Sound signals from microphone 136 are generally captured as analog audio signals and converted to digital form by an analog to digital converter or other similar component and/or process. A digital signal is thereby provided to the processor 102 of the portable computing device 100, the digital signal representing the audio content captured by microphone 136. In some embodiments the microphone 136 is local to the headphones 138 or other head-worn component of the user. In some embodiments the microphone 136 is interfaced to the portable computing device 100 by a Bluetooth® link. In some embodiments the microphone 136 comprises a plurality of microphone elements. This can allow users to talk to each other, while engaging in a collaborative experience, making it more fun and social. Allowing users to talk to each other could also be distracting and could be not allowed.

The audio subsystem 134 generally also includes headphones 138 (or other similar personalized audio presentation units that display audio content to the ears of a user). The headphones 138 may be connected by wired or wireless connections. In some embodiments the headphones 138 are interfaced to the portable computing device 100 by the Bluetooth® communication link.

The portable computing device 100 includes an operating system, the necessary hardware and software drivers necessary to fully utilize the devices coupled to the communications infrastructure 132, media playback and recording applications and at least one Collaborative Intent Application 144 operatively loaded into main memory 104, which is designed to display information to a user, collect input from that user, and communicate in real-time with the Central Collaboration Server 142. Optionally, the portable computing device 100 is envisioned to include at least one remote authentication application, one or more cryptography applications capable of performing symmetric and asymmetric cryptographic functions, and secure messaging software. Optionally, the portable computing device 100 may be disposed in a portable form factor to be carried by a user.

Figure 2:
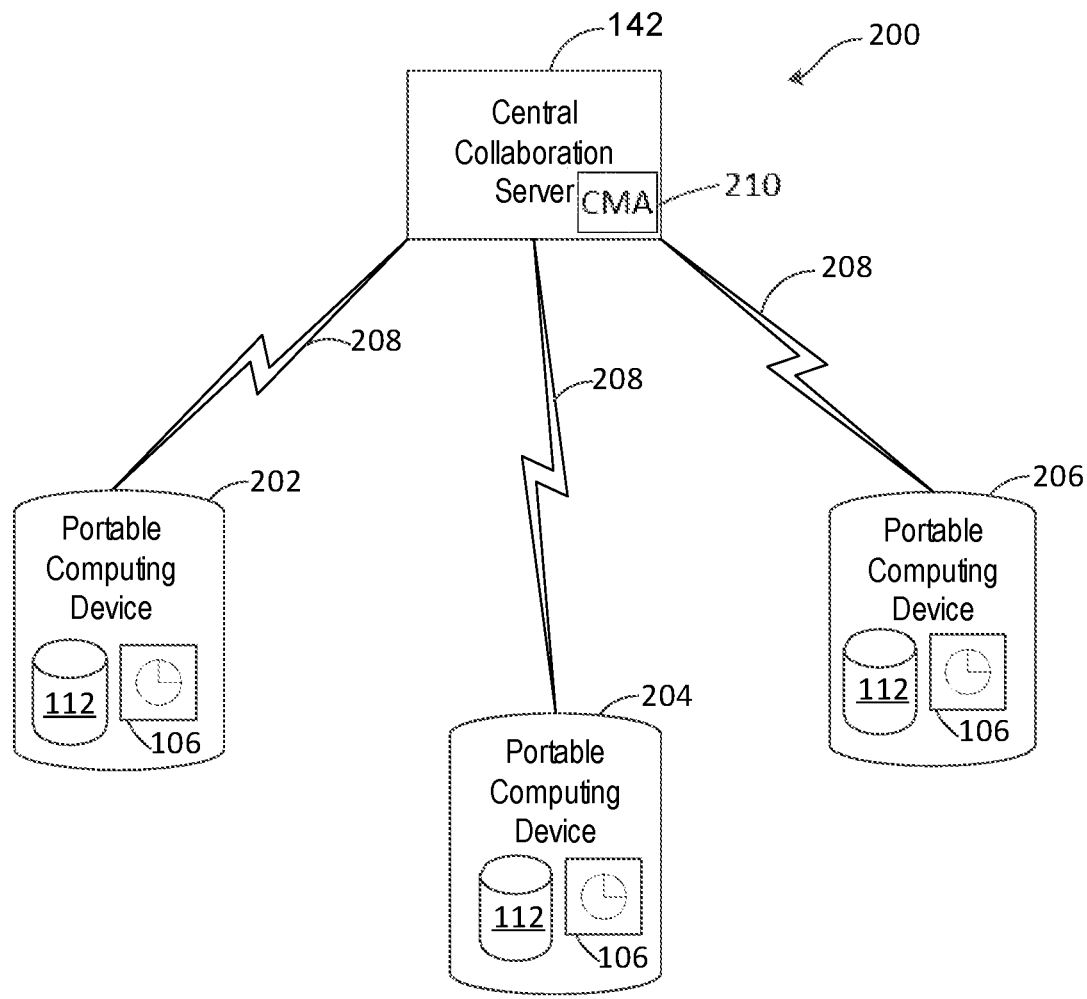
FIG. 2 is a schematic diagram of an exemplary real-time collaboration system.

Referring next to FIG. 2, a collaboration system 200 is shown in one embodiment of the present invention. Shown are the central collaboration server 142, a plurality of the secondary memory subsystems 112, a plurality of the timing circuits 106, a first portable computing device 202, a second portable computing device 204, a third portable computing device 206, and a plurality of exchanges of data 208.

The group of users (participants), each using one of the plurality of portable computing devices 100, each portable computing device 100 running the Collaborative Intent Application 144, each device 100 in communication with the Central Collaboration Server 142, may engage in the collaborative experience that evokes a collective intelligence (also referred to as Collective Consciousness).

As shown in FIG. 2, the CCS 142 is in communication with the plurality of portable computing devices 202, 204, 206. Each of these devices 202, 204, 206 is running the Collaborative Intent Application (CIA) 144. In one example, each of the devices 202, 204, 206 is an iPad® running the CIA 144, each iPad® communicating with the CCS 142 which is running a Collaboration Mediation application (CMA) 210. Thus, we have the local CIA 144 on each of the plurality of devices 202, 204, 206, each device 202, 204, 206 in real-time communication with the CMA running on the CCS 142. While only three portable devices 202, 204, 206 are shown in FIG. 2 for clarity, in ideal embodiments, dozens, hundreds, thousands, or even millions of devices 100 would be employed in the collaboration system 200. Hence the CCS 142 must be in real-time communication with many devices 100 at once.

The communication between the CCS 142 and each of the devices 202, 204, 206 includes the exchanges of data 208. The data has a very significant real-time function, closing the loop around each user, over the intervening electronic network.

As described above, the present invention allows the group of users, each using their own tablet or phone or other similar portable computing device 100, to collaboratively answer questions in real-time with the support of the mediating system of the CCS 142 which communicates with the local CIA 144 running on each device 100. The Collaborative Intent Application 144 ties each device 100 to the overall collaborative system 200. Multiple embodiments of the CIA 144 are disclosed herein. The Collaborative Intent Application (CIA) 144 may be architected in a variety of ways to enable the plurality of portable computing devices 100 to engage in the collaborative processes described herein, with the supportive use of the Central Collaboration Server 142.

In some embodiments the exchange of data 208 may exist between portable computing devices 100.

Figure 3:
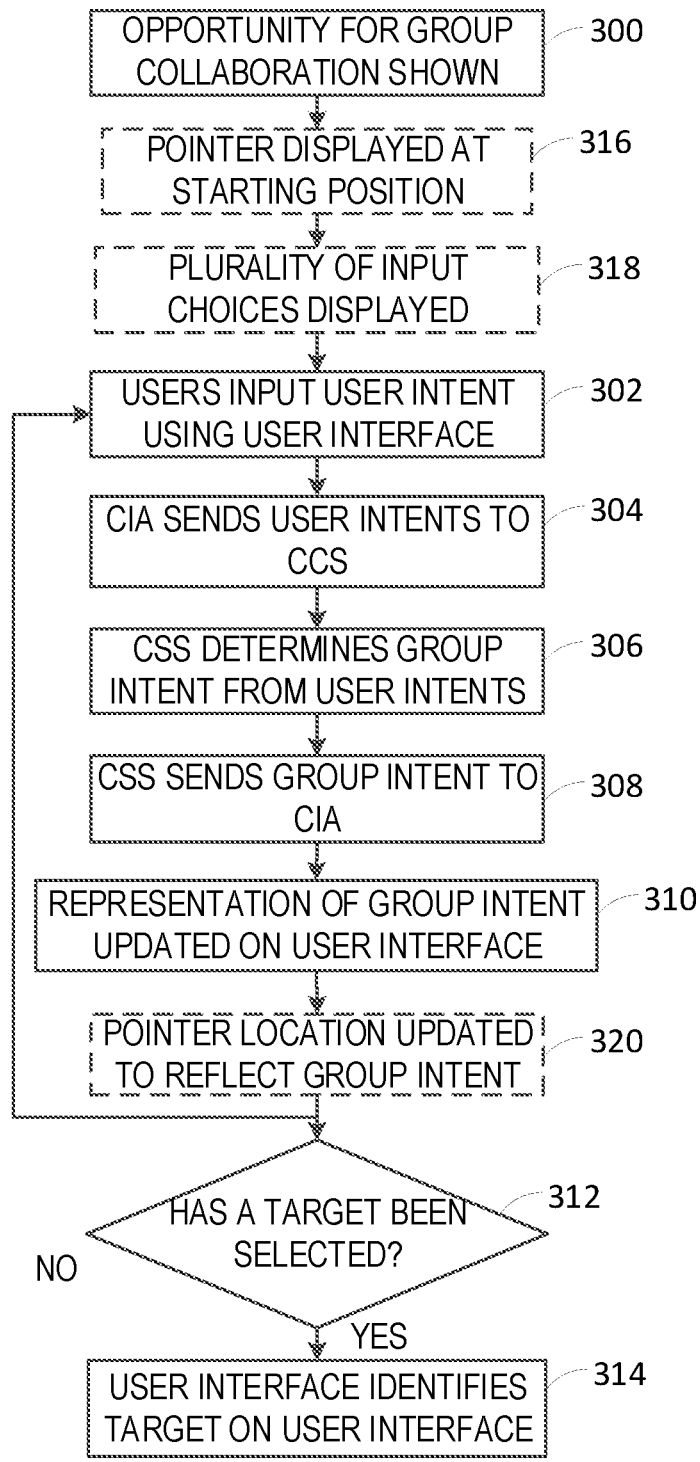
FIG. 3 is a flowchart of an exemplary group collaboration process using the collaboration system.

Referring next to FIG. 3, a flowchart of one embodiment of a group collaboration process is shown. Shown are a collaboration opportunity step 300, a user input step 302, a send user intents to CCS step 304, a determine group intent step 306, a send group intent to CIA step 308, a display intents step 310, a target selection decision point 312, and a display target step 314. The process also includes optional steps that could be included, for example, for a pointer graphical embodiment: a display pointer start position step 316, a display input choices step 318, and an update pointer location step 320. In the collaboration opportunity step 300, the CIA 144 receives the group collaboration opportunity from the CCS 142 and displays the opportunity on the display 110 of the portable computing device 100 (PCD). The group collaboration opportunity may be a question to be answered, for example, "What film will win the Best Picture in the Academy Awards?" or "Who will win the Super Bowl?" The process then proceeds to the user input step 302. The user input step 302 includes the user using the display 110 of the computing device 100 to input the user intent. The user intent is an input interpreted by the user interface 124 as a desired vector direction conveying an intent of the user. In some embodiments (described in the related applications), the user intent is a desired vector direction of the graphical pointer 406 of the user interface 124, and the user input includes swiping of the pointer 406 via the touchscreen interface. The user input step 302 takes place for each user of the group. The process then proceeds to the send user intent to CCS step 304.

In the send user intent to CCS step 304, the CIA 144 for each PCD 100 sends the user intent to the CCS 142. In the next step, the determine group intent step 306, the CCS 142 determines a collective group intent based on the plurality of user intents. The group intent may be determined through various methods, as described further below. The process then proceeds to the send group intent to CIA step 308.

In the embodiment including the optional steps display pointer start position 316 and the display input choices step 318, in the display pointer start position step 316 the graphical user interface 124 would display the starting, or neutral, position of a pointer chosen to indicate the graphical representation of the group intent. In the following step, the display input choices step 318, the user interface 124 would display a plurality of input choices 412 available to be selected by the group intent by using the pointer. The user intent in this embodiment is an input interpreted by the user interface 124 as representing that user's desired motion of the collaborative graphical pointer with respect to the plurality of input choices.

In the send group intent to CIA step 308, the CIA 144 receives the group intent from the CCS 142. Next, in the display intents step 310, for each computing device 100 the received representation of the group intent is displayed, along with a representation of the user intent originally input by the user of the computing device 100. The process then proceeds to the target selection decision point 312.

The update pointer location step 320 may be inserted between the display intents step 310 and the target selection decision point 312. In the update pointer location step 320, in the embodiments including the pointer 410 the user interface 124 updates to indicate the current location of the pointer in response to the received group intent.

In the target selection decision point 312, if the group intent received corresponds to selection of the target (in some embodiments, from among the input choices), the process proceeds to the display target step 314, and the selected target is displayed on the display 124. If the group intent has not selected the target, the process returns to the user input step 302, and the process repeats until the target is determined by the group intent or until the process is otherwise ended (for example, by a time limit).

After the target has been chosen by the group intent, the entire process may repeat, for example, to form a word if each consecutive target is an alphabetic character.

Referring again to FIGS. 1, 2 and 3, the collaboration system in one embodiment as previously disclosed in the related applications employs the CCS 142 that users connect to via their portable computing device 100. In some embodiments, fixed or non-portable computing devices 100 can be used as well. In many embodiments, users choose or are assigned a username when they log into the CCS 142, thus allowing software on the CCS 142 to keep track of individual users and assign each one a score based on their prior sessions. This also allows the CCS 142 to employ user scores when computing the average of the group intent of all the users (in embodiments that use the average).

In general, when the session is in progress, the question is sent from the CCS 142 to each of the CIA 144 on the portable computing devices 100 of the users. In response to the question, the users convey their own intent either by manipulating an inner puck of the pointer, as described in the related applications, or by using a tilt or swipe input or other user interface methods. In some embodiments, the user's intent is conveyed as a direction and a magnitude (a vector) that the user wants the pointer to move. This is a user intent vector and is conveyed to the CCS 142. In some embodiments, the magnitude of the user intent vector is constant. The CCS 142 in some embodiments computes the numerical average (either a simple average or a weighted average) of the group intent for the current time step. Using the numerical average, the CCS 142 updates for the current time step the graphical location of the pointer within a target board displayed on the display 110. This is conveyed as an updated coordinate location sent from the CCS 142 to each of the CIA 144 of participating users on their own devices 100. This updated location appears to each of the users on their individual devices 100. Thus they see the moving pointer, ideally heading towards an input choice on the target board. The CCS 142 determines if and when the input choice is successfully engaged by the pointer and if so, that target is selected as an answer, or as a part of the answer (a single letter or space or punctuation mark, for example, that's added to an emerging answer). That target is then added to the emerging answer, which is sent to all the devices 100 and appears on each display 110.

While FIG. 3 illustrates one embodiment of the collaborative process, as shown in the related applications, many variations of the basic process are contemplated by the inventor.

Adaptive Outlier Analysis

While the systems described above enable human groups to amplify their collective intelligence and produce optimized predictions, forecasts, and decisions, what is needed are inventive methods that further optimize the intelligence of an Artificial Swarm Intelligence collaborative system so that it generates predictions, forecasts, and decisions of even greater accuracy. Specifically, what is needed is a method of distinguishing members of the population (i.e. human forecasting participants) that are likely to be high-insight performers (i.e. high performers) on a given prediction task as compared to members of the population who are likely to be low-insight performers (i.e. low performers) on a given prediction task, and doing so without using historical data about their performance on similar tasks. That's because there are many situations where historical data does not exist about user performance when providing insights in response to a query. The method disclosed herein is called Adaptive Outlier Analysis and it enables both crowd and swarm-based predictions to increase their accuracy in many situations.

When harnessing the intelligence of a CROWD (i.e. an open loop group) or a SWARM (i.e. a closed-loop system) it can be beneficial to curate the pool of human participants so as to increase their statistical likelihood of giving accurate insights in response to a query. The present invention enables the curation of human participants in two inventive forms—(I) taking an initial pool of baseline forecasting participants (i.e. a baseline population) and culling that pool down to a final pool of curated forecasting participants (i.e. an optimized forecasting population) which are then used for crowd-based or swarm-based intelligence generation, and/or (II) taking a pool of baseline forecasting participants and assigning weighting factors to those participants based on their likelihood of giving accurate insights (i.e. giving a higher weight within a swarm to participants who are determined to be more likely to give accurate insights than participants who are determined to be less likely to give accurate insights). In some inventive embodiments, both culling and weighting are used in combination—giving a curated pool that has eliminated the participants who are most likely to be low insight performers, and weighting the remaining members of the pool based on their likelihood of being accurate insight performers.

To perform the culling and/or weighting process, many methods are possible. The present invention is focused on an inventive method that does not require any previous historical data about the insight level of the participants when performing a similar task (i.e. it does not require historical data about the accuracy of the insights provided by participants on prior tasks for which the outcome is already known). That said, other inventive methods by the present inventor do use historical performance, for example, as disclosed in previously mentioned U.S. patent application Ser. No. 14/859,035.

Instead, the present invention is focused on a process referred to herein as Adaptive Outlier Analysis which uses only the set of insights (i.e. predictions) given by each participant of a population, without knowledge of whether those insights (i.e. predictions) are correct or incorrect because the outcome of the event is still pending. For example, when predicting a set of 10 baseball games—a group of participants can provide insights in the form of predictions (i.e. a set of prediction data) for the winner of each those 10 baseball games. The present invention is aimed at identifying those users who are most likely to be low-insight performers (i.e. low performers who have low accuracy in predicting the 10 games) as compared to those users who are most likely to be high-insight performers (i.e.

high performers who have high accuracy in predicting the 10 games). Thus before the games are played (i.e. without knowing which predictions are accurate and which are not accurate), the present invention enables the statistical identification of participants who are most likely to be less accurate performers compared to other participants who are most likely to be more accurate performers. Once this identification is made, the group (i.e. the baseline population) can be culled and/or weighted accordingly, thereby creating an optimized population for use in crowd-based and/or swarm-based forecasting processes.

Figure 4:
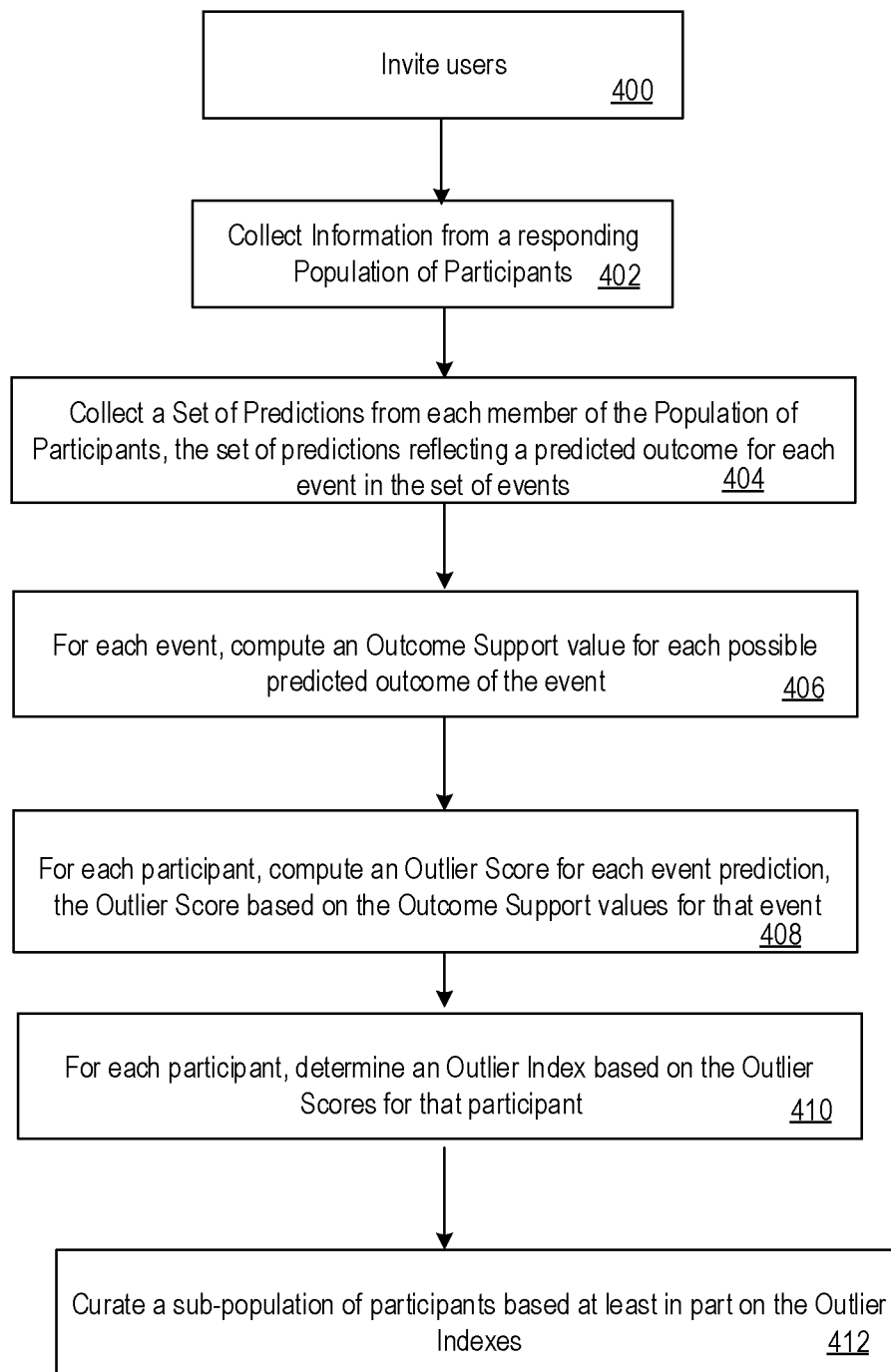
FIG. 4 is a flowchart for a first inventive method for performing Adaptive Outlier Analysis in accordance with one embodiment of the present invention.

Referring next to FIG. 4, a flowchart for a first inventive method for performing Adaptive Outlier Analysis is shown. The method begins in step 400 wherein a population of users are invited to engage in the Adaptive Outlier Analysis process, said users being networked users who interact with online resources. In some embodiments the system used is the collaboration system 200 of FIG. 2, where the population of users are members of the collaboration system 200 (wherein the central collaboration server functions as the survey platform and queries/collects information from the participants). In some embodiments the population of users is invited to an online cloud-based platform through an invitation provided on Facebook, Twitter, or other similar social networks. In some embodiments the population of users is invited to an online cloud-based platform through a direct email, direct text message, or other similar messaging technology. In some embodiments the population of users is invited to an online cloud-based platform through a digital advertisement presented on Facebook®, Twitter®, Reddit®, Google® AdWords®, or other suitable advertising mechanism. In some embodiments the population of users is acquired through a human sampling service or through a distributed worker service like Amazon Mechanical Turk®. However the population of users is targeted with an invitation, users choosing to participate are routed to an online survey system that collects personal data and individual predictions from the population. The online survey system can be a traditional commercial survey platform like Survey Monkey® or could be a conversational survey platform that collects data through text and/or verbal conversations with chat bots or even live moderators. As the platform used to interact with the users can take many forms (browser-based, mobile application, desktop application, etc.), the instances of programming used to query each participant and communicate with the processor used for analysis is referred to as an "application instance".

In the next collect information step 402, regardless of the data collection method employed, each of the population of participants responding to the invitation (also referred to as a baseline population of participants) is provided by the application instance with a set of queries and each participant is expected to provide a set of answers, the answers stored as accessible data. The questions may include personal contact information, personal demographic and psychographic information, and other personal metadata. For example, each user in a population engaged in a task to predict sporting events may be asked for their name, age, location, highest level of education, and political affiliation. They may also be asked to identify which sports they follow, which teams they are fans of, and how much time they spend following particular sports each week. They may also be asked to self-assess themselves on a subjective rating scale, for example being asked to rate their level of sports knowledge for a particular sport, rate their predictive skills for a particular sport, and rate their perceived abilities as compared to the average sports fan.

In the next collect predictions step 404, the survey platform (application instance) requires each member of the population to provide a set of predictions for a set of events, wherein each event in the set of events has a set of possible outcomes including at least two possible outcomes. The set of predictions, for example, may be a set of 10 sports games to be played on a particular day, each of which has three possible outcomes—Team A wins, Team B wins, the teams tie. Thus for each of the 10 sports games to be played on the particular day, each participant is asked to indicate their prediction (i.e. indicate if Team A wins, Team B wins, or if it's a tie). In some embodiments, each participant is also asked to rate their subjective confidence in each prediction on subjective rating scale, for example a scale from 0% to 100%. In some embodiments, each participant is asked to predict what percentage of other participants they expect will predict the same outcome as they predicted. For example, if a particular participant predicts that Team B will win, the participant will also predict that they have a confidence of 75% and that they expect 40% of the other participants will predict the same way that they have. They may also indicate that they would bet $25 out of a maximum of $100 on this particular outcome, as a further means of indicating their confidence in the predicted outcome. At the end of step 103, a set of data is collected for each of the participants in the population of participants, the data collected for each participant including a prediction of an outcome for each of the set of events, as well as one or more confidence metrics reflecting their absolute and/or relative confidence in the predicted outcome of the particular event. This set of participant data (both predictions and confidence metrics) is referred to herein as the Participant Prediction Dataset.

In the compute Outcome Support step 406, for each event in the set of events, the data in the Participant Prediction Dataset is processed by the main processor (in some embodiments the CCS 142) to determine the percentage of participants who predicted each of the possible outcomes for that particular event in the set of events. For example, it could be determined in a population of 200 sports fans who are predicting an English Premier League soccer game between Arsenal and Liverpool that 70% (i.e. 140 participants) predicted Arsenal will win, 20% (i.e. 40 participants) predicted Liverpool will win, and 10% (i.e. 20 participants) predicted the teams would tie. This is referred to as the Outcome Support Percentages for this particular event, with 70% support for the prediction that Arsenal will win, 20% support for the prediction that Liverpool will win, and 10% support for the prediction that the two teams will tie. Outcome Support Percentages are computed in this step for each event in the set of events. For example, Outcome Support Percentages may be computed for all 10 matches played on a given weekend within the English Premier League. In some embodiments, a scaled or normalized version of the Outcome Support Percentages is computed, referred to as the Outcome Support Indexes. For example, in one embodiment, the participants who support a particular outcome are weighted based on the level of confidence they have indicated in one or more confidence metrics associated with their predictions. In such embodiments, a highly confident participant will count more in the Outcome Support Percentage computation than a less confident participant. While the output of step 406 can be the simple Outcome Support Percentage or the more sophisticated Outcome Support Index, the process proceeds similarly to step 408 wherein the Outcome Support values (Percentage or Index)

are used to determine Outlier Scores for each participant. Outcome Support values are also referred to herein as support values.

In step 408, an Outlier Score is computed by the processor for each participant in the population of participants based on (a) the predictions made by that participant for the set of events and (b) the Outcome Support values computed for each corresponding event within the set of events. The Outlier Score for a given user and a given event is computed such that a higher score is assessed when a user predicts an outcome for that event that has a low percentage (or a low index) in the Outcome Support values. Accordingly, the Outlier Score for a given user and a given event is computed such that a lower score is assessed when a user predicts an outcome for that event that has a high percentage (or high index) in the Outcome Support values. For example, if a user predicts that Arsenal will win the game between Arsenal and Liverpool, and the Outcome Support Percentage for Arsenal winning is 70%, the user predicted an outcome that has a high degree of support within the population of participants. This corresponds with a low Outlier Score for this user for this game. Conversely, if the user predicts that the teams will tie, and the Outcome Support Percentage for the game ending in a tie is 10%, the user predicted an outcome that has a low degree of support within the population of participants. This corresponds with a high Outlier Score for this user for this game. In fact, this user would be considered an outlier within the population, for he or she predicted an outcome that had very low support within the overall population.

A variety of algorithmic methods have been employed to compute Outlier Scores. In one embodiment, the outlier score is computed as $$(100\% - \text{Outcome\_Support})^2$$

Where Outcome_Support is the Outcome Support Percentage that corresponds with the outcome predicted by the given participant.

For example, in the case described above wherein a user predicts Arsenal winning, and wherein the Outcome Support Percentage for Arsenal is 70%, the Outlier Score is computed as $(100\% - 70\%)^2 = (0.3)^2 = 0.09$, or 9%. This is a very low Outlier Score for this event because the user predicted an outcome that had very high support within the population. In the other case described above wherein the user predicts a tie and wherein the Outcome Support Percentage for a tie is 10%, the Outlier Score is computed as $(100\% - 10\%)^2 = (1-0.1)^2 = 0.81$, or 81%. This is a very high Outlier Score for this event because the user predicted an outcome that had very low support within the population. In this step 308, each user in the population of participants is assigned an Outlier Score for each prediction made by that user in the set of events. Thus if there were 100 participants and 10 events, 1000 outlier scores are generated (ten outlier scores for each of the 100 participants).

Referring next to step 410, an Outlier Index is computed by the processor for each participant in the population of participants, the Outlier Index being based on the participant's Outlier Score for each of the events within the set of events. Thus if there were 10 events in the set of events, the Outlier Index for each participant is based on that participant's Outlier Score for each of the 10 events. In this way, the Outlier Index indicates the participant's general trend in Outlier Scoring across all the events in a given set of events. The Outlier Index can be computed in a variety of inventive ways. In some embodiment, the Outlier Index is computed as the average Outlier Score assigned to that participant across the set of events. For example, if there were 10 events in the set of events, the participant would have been assigned 10 outlier scores in the prior step (step 308). In this step 310, the participant would be assigned an Outlier Index equal to the mean of the outlier scores assigned to those ten events. In other embodiments, the Outlier Index is computed as a weighted average, where the outlier scores are weighted based on the confidence metrics that a participant associated with each of the predictions in the set of events. An outlier score associated with a high confidence metric is weighted strongly in the Outlier Index, while an outlier score associated with a low confidence metric is weighted weakly in the Outlier Index. This has an inventive benefit, for it gives an Outlier Index that rewards users with a low contribution to their Outlier Index if they had low confidence in a pick that had a high Outlier Score, as they knew that they were making an unusual pick. Conversely, it gives an Outlier Index that penalizes users with a high contribution to the index if they had high confidence in a pick that earned a high Outlier Score, as they likely did not know they were making an unusual pick. Thus, this inventive method works to reward participants who are self-aware when their predictions are likely to be contrarian, and penalizes participants are unaware when their predictions are likely to be contrarian. Note—statistically speaking, predictions that have a low Outcome Support Percentage are generally riskier predictions, and thus should be associated with lower confidence metrics across a large number of events, Referring next to step 412, once an Outlier Index has been generated for each of the participants in the population of participants, a curated sub-population is determined by the processor from the full population of participants. The curated sub-population is generated based at least in part on the Outlier Index values generated for each of the participants in the full population. In some embodiments, other values are used as well, for example user meta-data regarding each user's self-assessment of knowledge in the subject at hand, either absolute or relative to the average participant in the population. The inventive process of curating a sub-population involves the inventive steps of (a) removing participants from the population based at least in part upon their Outlier Index being above a certain value, and/or (b) generating a weighting factor for participants within the population, the weighting factor based at least in part upon that user's Outlier Index as compared to other user's Outlier Indices. Said weighting factors are then used by subsequent crowd-based and/or swarm-based methods for generating insights from the group. For example, in crowd-based methods that compute a statistical average of predictions, the weighting factors are used to weight each user's predictive contribution to that statistical average. Or, for example, in swarm-based methods that enable a real-time control system, the weighting factors are used to weight each user's influence upon the real-time control system.

In some embodiments, a statistical distribution of Outlier Scores is generated for the full population of users in the population of participants. In some such embodiments, a threshold level within that statistical distribution is computed such that any users with an Outlier Score above the threshold level are not included in the sub-population that is used for crowd-based or swarm-based predictions. In some embodiments the statistical distribution is a reasonable approximation of a normal distribution, and the threshold is defined in terms of a standard deviation. In one such embodiment, users who have an outlier index that is more than 1 standard deviation above the mean, are not included in the curated sub-population.

Figure 5:
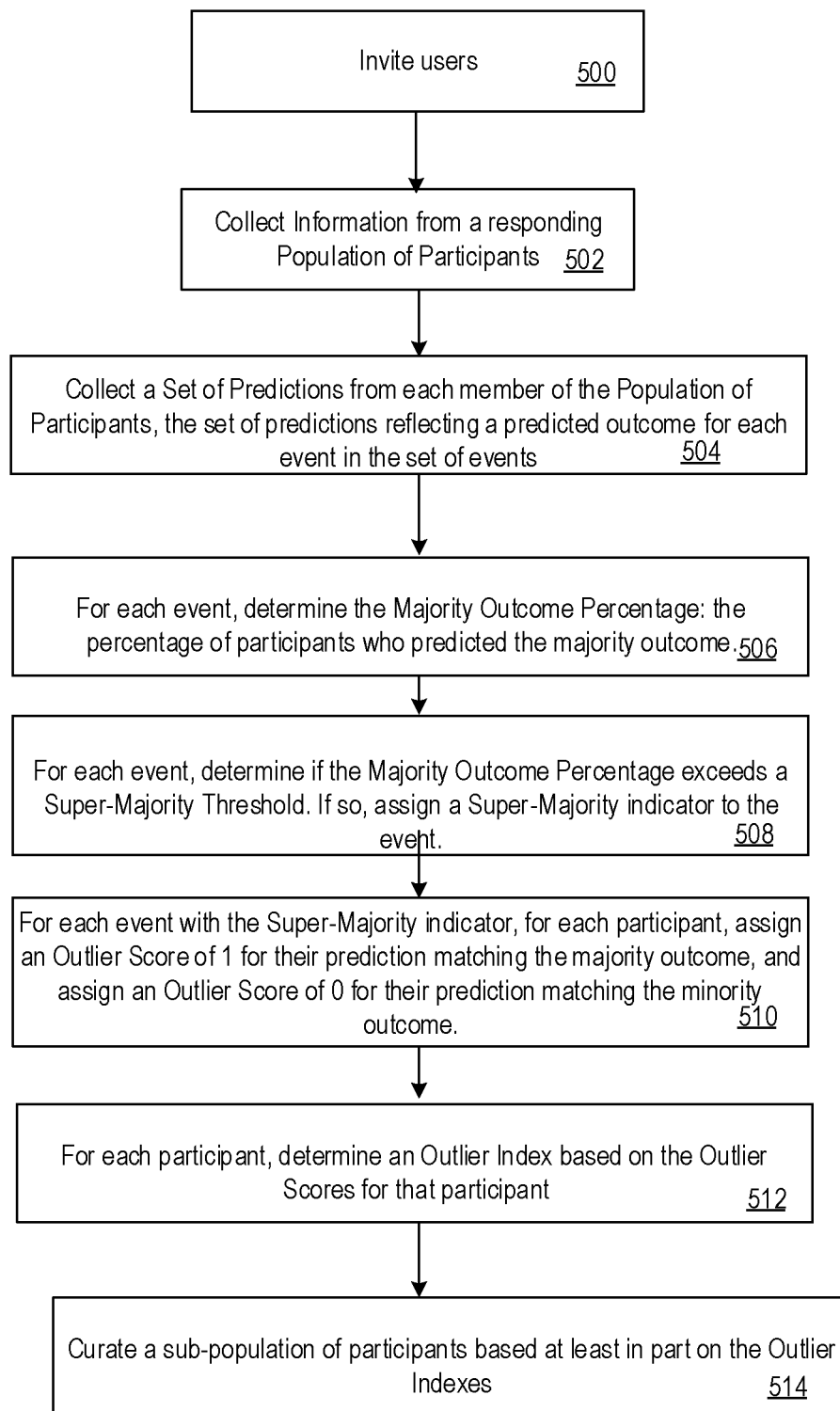
FIG. 5 is a flowchart for a second inventive method for performing Adaptive Outlier Analysis in accordance with another embodiment of the present invention.

Referring next to FIG. 5, a flowchart for another embodiment of the inventive method for performing Adaptive Outlier Analysis is shown, wherein the event outcomes are binary.

There is a large class of events wherein the predictive outcomes have only two conditions, i.e. the event outcomes are binary. For example, baseball games in the US have only two outcomes—Team A wins or Team B wins. Similarly, some financial predictions can be represented with binary outcomes as well—price goes up, or price goes down. In such situations, a simplified method can be used that reduces the computational burden of the process associated with FIG. 4. In this simplified method, shown in FIG. 5, the Outcome Support Percentages can be compared against a Super-Majority Threshold percentage, below which there's not enough consensus in an outcome to assign any score contributions to an outlier index. In one preferred embodiment, the Super-Majority Threshold percentage is approximately 68%, which has been determined experimentally to provide highly effective outcomes.

In FIG. 5, the binary Adaptive Outlier Analysis process starts with steps 500, 502, and 504, which are similar to the description of events 400, 402 and 404 with respect to FIG. 4. In these steps, a Population of Participants is engaged for a Set of Events, but in this case, each of the set of events has only two possible outcomes. For example—Team A wins or Team B wins. Thus in step 504, a set of predictions is collected from each member of the Population of Participants, each prediction in the set being an indication of which of the two possible outcomes the participant believes is most likely. In addition to collecting outcome predictions, the method may also include the collection of confidence metrics for the predicted outcome—for example, a subjective rating of confidence on a scale of 0 to 100%. In some embodiments, the user is asked to predict the odds that their chosen outcome will be the correct chosen outcome on a scale of 0 to 100%. In some embodiments, a confidence metric is used such that the participant is asked to predict what percentage of other participants will choose the same prediction that he or she did on a scale of 0 to 100%. In some embodiments, the participant is asked to assign a wager to the prediction, on a range of $0 to $100, as an indication of confidence.

In Determine Majority Outcome Percentage step 506, the inventive method determines which of the two outcomes received the majority of participant predictions, as well as computing the percentage of participants who provided this majority prediction. This value is stored as the Majority Outcome Percentage for that event. For example, if the outcome of Team A winning received the majority of predictions for Event 5 at a level of 78% of participants, then the Majority Outcome of event 5 is Team A, and the Majority Outcome Percentage for event 5 is 78%. Accordingly, the minority outcome would be Team B winning.

In step 508, for each event in the set of events, the Majority Outcome Percentage is compared against the Super-Majority Threshold value. If the Majority Outcome Percentage is greater than or equal to the Majority Threshold value, a Super Majority indicator is assigned to that event. For example, in the hypothetical "event 5" described in step 406 above, because 78% of participants predicted a Team A win, and because 78% exceeds the Super Majority Threshold of 68%, then event 5 is deemed a Super Majority event, supporting Team A. In practice, the Super Majority Threshold is chosen to be a high enough value that the majority is significant, but a low enough value that a plurality of events in the set of events are assigned Super Majority status. Ideally, 40% to 60% of events within a set of events earn Super Majority status, although it can fall outside that range. And if a large number of events are being predicted in the set, a higher threshold can be used, reducing the percentage of supermajorities.

In step 510, Outlier Scores are assigned to each participant of each Super Majority event. The scoring is such that if a participant predicted the Majority Outcome of a Super Majority event, they receive an Outlier Score=0 for that event, but if the participant did not predict the Majority Outcome of the Super Majority event, they receive an Outlier Score=1 for that event. This method ensures that outlier scores, across a set of events, will accrue for participants who consistently predict outcomes other than the Majority Outcome for Super Majority events. In some embodiments, the Outlier Score assigned for Super Majority events is scaled based on (a) one or more confidence metrics provided by the user for the prediction of the event, and/or (b) the Majority Outcome Percentage (for example, the amount by which the Super Majority Percentage exceeded the Super Majority Threshold). In such embodiments, the Outlier Score is lower for a participant who indicated low confidence in the prediction, and the Outlier score is higher for a participant who indicated high confidence in the prediction. In one embodiment, the Outlier Score for a user who predicts an outcome that is not the Majority Outcome is $$(1*Confidence\_Percentage)^2$$

where Confidence_Percentage is a percentage based on the confidence metrics provided by the participant. In this embodiment, the higher the confidence percentage provided, the higher the Outlier Score.

In steps 512 and 514, the process is very similar to 410 and 412 of FIG. 4, wherein the Outlier Index is generated for each user based on the Outlier Scores generated across the set of events, and wherein sub-populations are curated from the full Population of Participants based at least in part on the Outlier Index values generated for each of the participants in the full population. In some embodiments, other values are used as well, for example user meta-data regarding each user's self-assessment of knowledge in the subject at hand, either absolute or relate to the average participant in the population. The inventive process of curating a sub-population involves the inventive steps of (a) removing participants from the population based at least in part upon their Outlier Index being above a certain value, and/or (b) generating a weighting factor for participants within the population, the weighting factor based at least in part upon that user's Outlier Index as compared to other users' Outlier Indices. Said weighting factors are then used by subsequent crowd-based and/or swarm-based methods for generating insights from the group.

Referring again to FIGS. 4 and 5, both methods involve collecting a set of predictions from each member of the population of participants, the set of predictions reflecting a predicted outcome for each event in a set of events. In many embodiments, each prediction also includes one or more confidence metrics. To make this concrete, the participants may be given a survey that requires them to answer a set of questions either textually or verbally. For example, if the set of events was a series of 5 baseball games, each of which has a binary outcome (i.e. one of the two teams will win the game), the set of questions given to the participants may be configured as shown in FIG. 6.

Each participant responds to the questions of FIG. 6, resulting in a set of predictions for each of the five games (i.e. the set of events), along with confidence metrics. Since this is a binary outcome event, the method described in FIG. 5 may be used (although the method of FIG. 4 works as well). Using the method of FIG. 5, the method determines the percentage of participants who predicted the majority outcome for each of the five games. In the rare case that the group is perfectly split, there is no majority outcome. To avoid this, the pool of participants can be crafted to include an odd number of members.

Once the Majority Outcome Percentage has been computed for each of the five events (games), the Majority Outcome Percentages are compared against the Super-Majority Threshold to determine which events should be identified as a Super Majority. In this example, let's say that three of the five games were supported by a Majority Outcome Percentage that is higher than the Super-Majority Threshold.

For each of the three Super Majority events identified above, the process then assigns an Outlier Score to each participant. Those participants who chose the outcome that agrees with the Super Majority outcome are assigned a low Outlier score, while those participants who chose an outcome that goes against the Super Majority are assigned a high Outlier score. In the scoring method described in FIG. 5, the low Outlier Score assigned to those who predicted the Super Majority outcome is 0, and the high outlier score assigned to those who did not predict the Super Majority outcome is 1. In some embodiments, the score is scaled down from 1 based upon the confidence metrics, wherein a low confidence metric decreases the score more than a high confidence metric, as described above.

Finally, based on the Outlier Scores earned for each of the three outlier events, each participant is assigned an Outlier Index. If we take the simple case where the outlier scores are either 0 or 1, the Outlier Index can be computed as a normalized value from 0 to 1, where the value is 0 if the user earned no outlier points, the value is ⅓ (i.e. 0.33) if they earned 1 outlier point, is ⅔ (i.e. 0.67) if they earned 2 outlier points, and the index is 3/3 (i.e. 1.0) if they earned 3 outlier points.

The final step is to curate a population from the full population based on upon the outlier index values assigned to the participants. As described above, this can include (a) culling participants from the full populations, and/or (b) weighting participants in subsequent crowd-based and/or swarm-based prediction methods. For example, in a the very simple case the process may be designed to remove participants who earned an outlier index that is greater than 0.67. Thus, all participants who were assigned an outlier index above that score, are removed from the population and do not participant in a statistical crowd or a real-time swarm-based system. In addition, all participants who receive an outlier index of 0.67 or below are assigned a weighting factor based upon their outlier index, which reduces their contribution to the subsequent crowd-based or swarm-based prediction methods. In a simple example, the weighting factor is =(1−Outlier_Index) assigned to that user.

For example, when computing the statistical average prediction within a "wisdom of crowds" method, the contribution of each user to that statistical average can be weighted by (1−Outlier_Index) for that user. Similarly, when enabling users to participate in a real-time swarm, the User Intent values that are applied in real time can be scaled by a weighting factor of (1−Outlier_Index) for that user. In this way, users that are statistically most likely to provide incorrect insights are either removed from the population and/or have reduced influence on the outcome. What is significant about this method is that it does not use any historical data about the accuracy of participants in prior forecasting events. It enables a fresh pool of participants to be curated into a population that will give amplified accuracy in many cases.

In some embodiments of the present invention, a plurality of values are generated for each participant within the population of participants that reflect that participant's overall character across the set of events being predicted. The Outlier Index is one such multi-event value that characterizes each participant with respect to the other participants within the population across a set of events being predicted. In addition, a Confidence Index is generated in some embodiments of the present invention as a normalized aggregation of the confidence values provided in conjunction with each prediction within the set of predictions. For example, in the sample set of questions shown in FIG. 5, each prediction includes a Confidence Question on a scale of 0% to 100% (questions 2, 6, 10, 14, and 18). For each user, the Confidence Index is the average confidence the user reports across the full set of predictions, divided by the average confidence across all users across all predictions in the set. This makes the Confidence Index a normalized confidence value that can be compared across users. In addition, multi-event self-assessment values are also collected at the end of a session, after a participant has provided a full set of predictions. For example, as shown in FIG. 6, each participant was asked four questions (21-24) after completing the set of predictions. The questions, shown here in generalized form, were:
 (a) Predicted Self Accuracy: What Percentage of five game outcomes above do you think you predicted correctly?
 (b) Predicted Group Accuracy: What Percentage of the five game outcomes above do you think the group, on average predicted correctly?
 (c) Self-Assessment of Knowledge: How knowledgeable do you consider yourself with respect to the topic at hand?
 (d) Group-Estimation of Knowledge: How knowledgeable to do you consider the average participant in the population?

Figure 7:
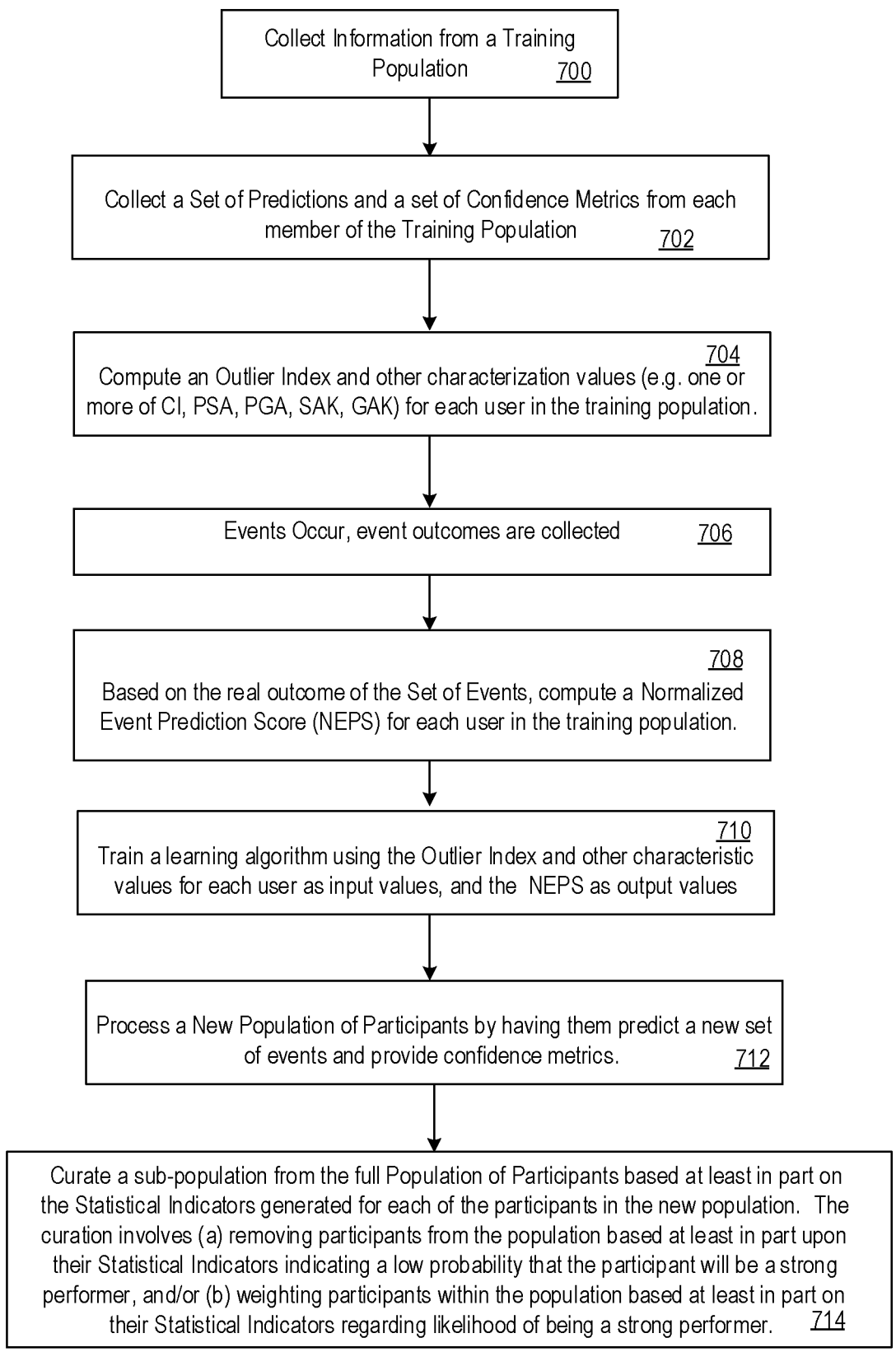
FIG. 7 is a flowchart of for an exemplary machine learning training phase process in accordance with one embodiment of the present invention.

Referring next to FIG. 7, a flowchart for a machine learning training phase process is shown in one embodiment of the present invention. In some embodiments of the present invention, a plurality of multi-event characterization values are computed during the data collection and analysis process including (1) Outlier Index, (2) Confidence Index, (3) Predicted Self-Accuracy, (4) Predicted Group Accuracy, (5) Self-Assessment of Knowledge, and (6) Group-Estimation of Knowledge. In such embodiments, additional methods are added to the curation step (i.e. step 312 or step 414) wherein Machine Learning is used to find a correlation between the multi-event characterization values and the performance of participants when predicting events similar to the set of events.

In such embodiments (as shown in FIG. 7), a Training Phase is employed using machine learning techniques such as regression analysis and/or classification analysis employing one or more learning algorithms. In the first step 700, the training phrase is employed by first engaging a large group of participants (for example 500 to 1000 participants). In the next step 702 the participants are employed to make predictions across a large set of events (for example, 20 to 30 baseball games). A set of confidence metrics is also collected for each participant.

In the next step 704, for each of these 500 to 1000 participants, and across the set of 20 to 30 events to be predicted, a set of values are computed including an Outlier Index (OI) and at least one or more of a Confidence Index (CI), a Predicted Self Accuracy (PSA), a Predicted Group Accuracy (PGA), a Self-Assessment of Knowledge (SAK), and a Group Estimation of Knowledge (GAK) (i.e. at least one value selected from that group).

In the next step 706, the events occur, and the event outcomes are collected.

In step 708, user performance data is collected after the predicted events have transpired (for example, after the 20 to 30 baseball games have been played). This data is then used to generate a score for each of the large pool of participants, the score being an indication of how many (or what percent) of the predicted events were forecast correctly by each user. This value is generally computed as a normalized value with respect to the mean score earned across the large pool of participants. This normalized value is referred to as a Normalized Event Prediction Score (NEPS).

The next step, 710, is the Training Phase wherein the machine learning system is trained (for example, using a regression analysis algorithm or a neural network system) to find a correlation between a plurality of the collected characterization values for a given user (i.e. at least two from the group of the Outlier Index, the Confidence Index, a Predicted Self Accuracy, a Predicted Group Accuracy, a Self-Assessment of Knowledge, and a Group Estimation of Knowledge) and the Normalized Event Prediction Score for a given user.

This correlation, once derived, can then be used in step 712 by the inventive methods herein on characterization value data collected from new users (new populations of users) to predict if the users are likely to be a strong performer (i.e. have high normalized Event Prediction Scores). In such embodiments, the machine learning system (for example using multi-variant regression analysis) will provide a certainty metric as to whether or not a user with a particular combination of characterization values (including an Outlier Index) is likely to be a strong or weak performer when making event predictions.

Thus, the final step 714 in the Optimization and Machine Learning process is to use the correlation that comes out of the Training Phase of the machine learning system. Specifically, the trained model is used by providing as input a set of characterization values for each member of a new population of users, and generating as output a statistical profile for each member of the new population of users that predicts the likelihood that each user will be a strong performer based only on their characterization values (not their historical performance). This is a significant value because it enables a new population of participants to be curated into a high performing sub-population even if historical data does not exist for those new participants.

Figure 8:
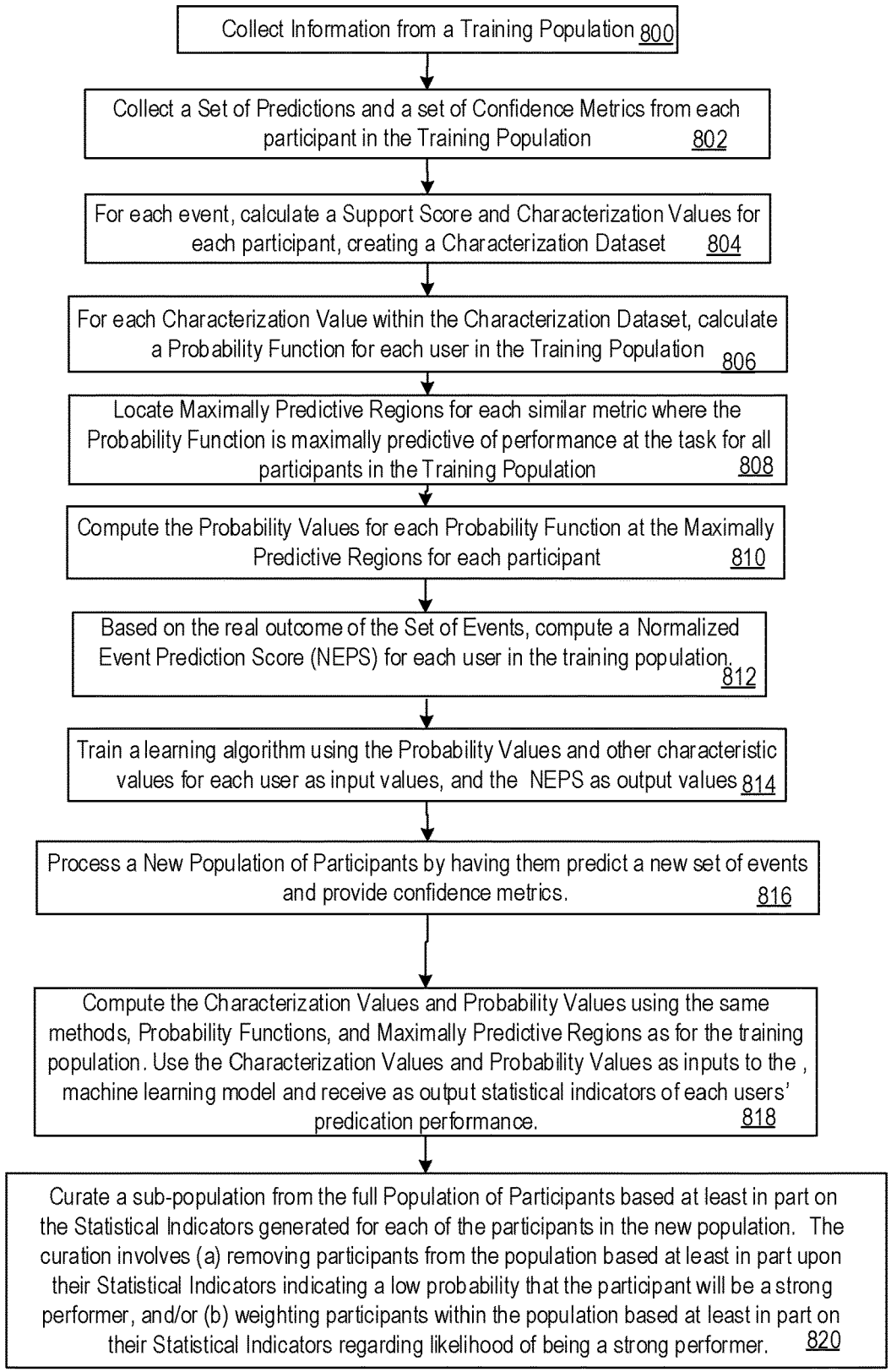
FIG. 8 is a flowchart of for an exemplary machine learning training phase process using characterization value in accordance with another embodiment of the present invention.

Referring next to FIG. 8, a flowchart for a machine learning training phase process using characterization values is shown in one embodiment of the present invention.

In some embodiments of the present invention, the characterization values for similarly performing users can be variable between populations and depending on the events responded to. In such embodiments, additional methods are substituted for the Score Generation Steps (i.e. step 704 and 710 of FIG. 7) where the characterization values for each event a user responds to are aggregated into a description of the distribution of those characterization values.

Steps 800 and 802 are similar to steps 700 and 702 of FIG. 7, where a training population is engaged and prediction sets and confidence metrics sets are collected. In step 804, the characterization values for each user's responses to each event are added into a Characterization Dataset. In some embodiments, the Characterization Dataset takes the form of a software Dictionary object, with Participant Worker IDs as dictionary keys, and entries within the dictionary being an N×M matrix, where N is the number of events predicted, and M is the number of Characterization Value types for each event. Therefore, element (n,m) within the matrix would refer to game n, Characterization Value type m.

In step 806, For each characterization value type within this Characterization Dataset (e.g. Outcome Support Percentages or Predicted Self Accuracy), a Probability Function is defined. This Probability Function acts as a metric to define the probability of the user's next response to an arbitrary event for this type of Characterization Value. In some embodiments, this Probability Function takes the form of a kernel-density estimate using Gaussian Kernels. In some embodiments, this takes the form of a Normalized Histogram with defined bin-widths. In some embodiments, this takes the form of a Normalized Fourier Transform. In general, the Probability Function integrates to 1 over the space in question, to form a proper measure of a probability density function. For those embodiments where the Probability Function takes the form of a Kernel-Density estimate using Gaussian kernels, an example probability function $P(x)$ for a user i with n Characterization Values for each response $CV_1 \ldots CV_n$ may be:

$$P_i(x) = \frac{1}{n}\sum_n \frac{1}{\sigma\sqrt{2\pi}} e^{-0.5\left[\frac{x-CV_n}{\sigma}\right]^2}$$

for some defined $\sigma$. In some embodiments $\sigma$ is chosen through experimentation. In some embodiments $\sigma$ is chosen through standard rules such as Silverman's Rule or Scott's Rule.

In the next step 808, once the Probability Function is defined for each Characterization Value type and is normalized to become a proper measure of probability across the Characterization Value space, Maximally Predictive Locations are located for each Probability Function where the Probability Function at the Maximally Predictive Location is maximally predictive of performance of users at that task. In some embodiments, the Maximally Predictive Locations take the form of singular locations where the Probability Function at the singular location is most predictive of performance of users at that task. In some embodiments, the Maximally Predictive Locations take the form of a number of singular locations where the Probability Function at the singular locations is most predictive of performance of users at that task. In some embodiments, the Maximally Predictive Locations are regions or areas that are most predictive of performance of users. In some cases, predictiveness is measured using correlation between the Probability Function at the Maximally Predictive Location and the user's performance. In some cases, the number and location of Maximally Predictive Location can be a function of the Probability Function itself, such as finding all locations where the Probability Function is equal to a single value, or the locations where the Probability Function has local maxima. An example of a Probability Function that takes the form of a kernel-density estimate using Gaussian Kernels, applied to many participants' Outcome Support Indexes, is shown below in FIG. 9 (as shown by the plurality of plotted participant probability functions 904). A first maximally predictive location 900 is shown. A second maximally predictive location 902 is also shown. The maximally predictive locations 900, 902 highlight two likely instances of Maximally Predictive Locations for this data as an example of the type of space that a Maximally Predictive Location falls in, from which multiple singular Maximally Predictive Locations may be selected for further analysis. There exists clear correlation between Probability Function value at these points and each agent's Normalized Event Prediction Score (plotted as line density in FIG. 9), indicating that the probability Function value may be a good predictor of agent performance, as measured by the Normalized Event Prediction Score.

Once the Maximally Predictive Locations(s) are found, in step 810 Probability Values may be calculated for each Probability Function at the Maximally Predictive Location. In some cases, the Probability values are the value of the Probability Function at Maximally Predictive Location. In some cases, if the Maximally Predictive Location is a function of the Probability Function, the Probability Values can be the distances between Maximally Predictive Locations.

In step 812, the events occur, the event outcomes are collected and user performance data is collected after the predicted events have transpired and the NEPS for each user is generated as in the method of FIG. 7.

In step 814, a machine learning model is trained using the Probability Values and other characteristic values for each participant as inputs, and the Normalized Event Prediction Score for each user as output values In the next step 816, a new population of participants is processed by having them predict a new set of events and provide confidence metrics. In step 818, once Probability Functions have been defined for each Characterization Value, and Maximally Predictive Location(s) have been found for each Probability Function, and a method for assigning Probability Values to users in a Training Population has been set, The Probability Values for New Populations of Participants can be assigned using the same Probability Functions, Maximally Predictive Location(s), and methods. These Probability Values are used to train Machine Learning systems on Training Populations and curate New Populations based on the trained Machine Learning systems.

Because these Probability Values describe the full distribution of responses, and do so using locations that are most related to the performance of users on the events in question, the values better capture the spectrum of responses of variable, noisy, human-defined data. The Probability Values have been shown experimentally to be more robust to system noise such as population variability and human variability in question response, and extend well to multi-event environments with variable number of events while predicting with higher accuracy a given population's performances. Such Probability Values provide significant inventive value because they enable a new population of participants to be more accurately and more flexibly curated into a high performing sub-population than previously described methods, using no historical data.

In the final step 820, the sub-population is curated based at least in part on the statistical indicators for the participants in the new population.

For illustrative purposes, an example embodiment of the method disclosed in FIG. 8 is provided as follows. A population of participants is engaged to predict whether the person depicted in each of a series of 20 videos has generated their smile as a result of a genuine or fake emotion. Data is collected from each of the participants using, for example, a survey structure as disclosed previously. Once the data is collected, the software system of the present invention may calculate the Characterization Values desired, for example the Outcome Support Percentages for each answer each user gave to the set of 20 videos. These Characterization Values are organized by user identifier in a dictionary object comprising a Characterization Dataset, with each user's dictionary entry corresponding to a 1×20 matrix of Characterization Values, the first row of which represents the Outcome Support Percentage for each of the User's answers. For both types of Characterization value, we may assign a Probability Function that takes the form of a kernel-density estimate using Gaussian Kernels.

Figure 9:
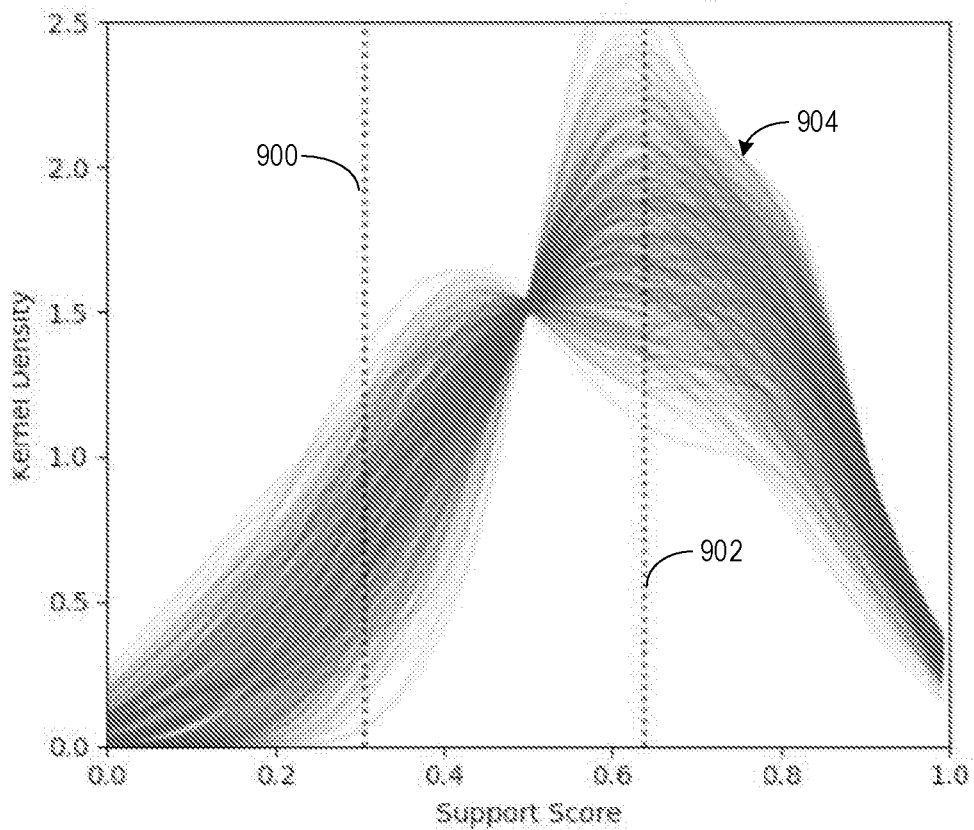
FIGS. 9 and 10 are exemplary probability function charts in one embodiment of the present invention.
Figure 10:
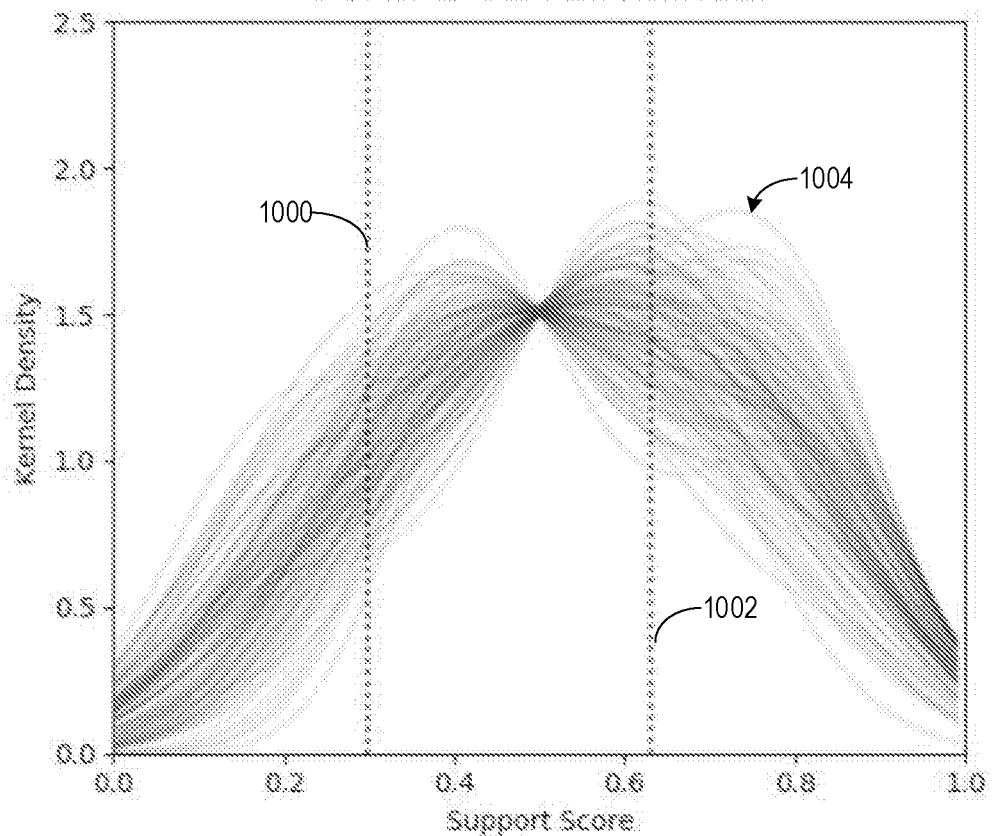

The plot of this Probability Function as applied to each user's Outcome Support Percentages is shown in FIGS. 9 and 10. For clarity, the users are divided into subgroups, where FIG. 9 shows the Probability function for users with high user performance ("Good Forecasters") and FIG. 10 shows the Probability Function for users with low user performance ("Bad Forecasters"). Each line 904, 1004 in FIGS. 9 and 10 represents a user, with the line optionally shaded by how well the user performed within the subset of users. Maximally Predictive Locations 900, 902, 1000, 1002 are shown. We may select Maximally Predictive Locations 900, 902, 1000, 1002 visually, then record the Probability Values from the probability function line 904 1004 for each user at the selected Maximally Predictive Locations 900, 902, 1000, 1002. For this example, say we select Maximally Predictive Locations 900, 902, 1000, 1002 of 30 and 63 for Outcome Support Percentages. These two Probability Values, sampled for each user, along with other singular Characterization Values such as Predicted Self Accuracy and Predicted Group Accuracy may then be used to train a Machine Learning Algorithm that predicts each participant's Normalized Event Prediction Score.

Once this Machine Learning Algorithm is trained, the system of the present invention can be used to process a new population of users, accepting and storing their responses to similar questions, calculating their Characterization Values and Probability Values using the same Maximally Predictive Locations and Probability Functions as before, and predicting their Normalized Event Prediction Scores using the trained Machine Learning Algorithm. For example, if we have 100 new participants in the new population, and we want to predictively select a sub-population of 25 optimized participants in order curate a high-performing Crowd or Swarm, the system of the present invention can be configured to choose the 25 participants with the highest Normalized Event Prediction Scores. These 25 participants form a sub-population (denoted a Refined Population). Empirical testing has demonstrated through repeated trials that such a Refined Population, when used to make predictions as a Crowd or Swarm, generally performs significantly better than a randomly-sampled 25 agents from the 100 new agent population (denoted Random Population).

In the smile evaluation example above, we've shown through extensive testing that an individual who is part of the Refined Population in this method gets on average 10.6% more questions correct in this dataset than the Random Population, or 1.163 times more questions correct.

In the realm of crowd-based predictions, if we consider the majority vote of the 25 participants of each sampled population as a Crowd Response, the Random Population's Crowd Response is correct 78.9% of the time, while the Refined Population's Crowd Response is correct 85.5% of the time, a reduction in the number of incorrect answers of 31.1% over the Random Population. Additionally, the standard deviation in number of answers correct of Crowd Responses for Random Crowds is 1.54, while the standard deviation of that of Refined Crowds is only 0.62, a 60% reduction in Crowd response variability. Therefore, we are able to create more accurate and more stable crowd responses, which is important if we want to run only 1 swarm and still have a reliable set of predictions. This is a highly significant result generated by using the inventive system disclosed herein. It's especially significant as it does not require any historical knowledge about the participants regarding their past performance on similar tasks.

Similarly, in the realm of swarm-based predictions, when participating within a real-time closed-loop swarm, such as disclosed in the related applications, the Refined Population also performs better than the Crowd Response accuracy quoted here, and still outperforms the Random Population.

Clearly, there's a significant performance advantage to using the methods and systems disclosed herein to curate populations of human participants, which comes from the inventive ability of being able to predict with higher accuracy which participants will perform well to creating significantly higher-performing and more reliable crowds and swarms.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for curating an optimized population of human forecasting participants using data collected from a baseline population of human forecasting participants, the system performing a software-based analysis identifying a likelihood that each participant will be an accurate forecaster without a need for historical accuracy data, the system comprising:

an analysis processing device including a processor and configured for network communication;

at least one data storage device in communication with the analysis processing device; and a plurality of application instances, wherein each application instance is configured for interacting with one participant and is in network communication with the analysis processing device, wherein the system is configured to perform the steps of:

present, to each baseline population participant via the application instance, a set of possible outcomes for each of a set of future sporting events, wherein each set of possible outcomes for each future sporting event has at least two possible outcomes;

collect a set of predictions from each baseline population participant via the application instance, wherein each set of predictions includes, for each future sporting event in the set of future sporting events, one possible outcome selected from the set of possible outcomes for that future sporting event, and wherein an actual outcome of each of the future sporting events is unknown at the time of collecting;

store, in a Participant Prediction Dataset, the set of predictions from each baseline population participant in association with that baseline population participant;

for each future sporting event in the set of future sporting events, compute, using the stored sets of predictions, at least one outcome support value for each possible outcome of that future sporting event, wherein each outcome support value is based at least in part on a percentage of baseline population participants that selected that possible outcome for that future sporting event;

for each baseline population participant, compute a set of outlier scores comprising an outlier score for each future sporting event, wherein the outlier score for the future sporting event is computed by algorithmically comparing the participant's selected outcome for that future event to the outcome support value for that possible outcome of that future sporting event, whereby the outlier score indicates how well that participant's selection aligned with the selections collected from the baseline population for that future sporting event;

store each set of outlier scores in the Participant Prediction Dataset in association with that baseline population participant;

for each baseline population participant, determine an outlier index based on the set of outlier scores computed for that participant, wherein the outlier index indicates how well the set of that participant's selections aligned with the selections collected from the baseline population;

curate an updated population of participants comprising applying a weighting value to each of the baseline population participants based at least in part upon a plurality of the outlier indexes, wherein the applied weighting values are lower for participants with the outlier index indicating low alignment with the baseline population participants and the applied weighting values are higher for baseline population participants with the outlier index indicating high alignment with the baseline population participants; and storing the weighting value in association with each participant on the at least one storage device, wherein the weighting values are accessible by at least one software process for use in generating a statistical group prediction for at least one sporting event of the group of sporting events.

2. The system for curating the optimized population of participants of claim 1, further comprising the system configured to perform the step of:

inviting users to participate, wherein the baseline population of participants comprises users who accept the invitation.

3. The system for curating the optimized population of participants of claim 1, further comprising the system configured to perform the step of:

collecting personal information from the baseline population of participants.

4. The system for curating the optimized population of participants of claim 1, further comprising the system configured to perform the step of:

after determining the outlier index for each baseline population participant, selecting a sub-population of participants based at least in part on the outlier indexes.

5. The system for curating the optimized population of participants of claim 1, further comprising the system configured to perform the step of:

collecting, from each baseline population participant, at least one quantitative confidence assessment, wherein each confidence assessment represents that participant's confidence in their selected possible outcome for one future sporting event of the set of future sporting events.

6. The system for curating the optimized population of participants of claim 5, the system further configured to perform the step of:

weighting at least one outcome support value based on a plurality of the confidence assessments.

7. The system for curating the optimized population of participants of claim 1, further comprising the system configured to perform the step of:

collecting, from each baseline population participant, a quantitative assessment of that participant's confidence in their knowledge of a specific knowledge category.

8. The system for curating the optimized population of participants of claim 1, further comprising the system configured to perform the step of:

after curating the baseline population of participants, participating, by the curated population in real time via the plurality of application instances, in at least one crowd-based or swarm-based prediction session for a future sporting event having at least two outcomes.

9. A method for curating an optimized population of human forecasting participants using data collected from a baseline population of human forecasting participants, the system performing a software-based analysis identifying a likelihood that each participant will be an accurate forecaster without a need for historical accuracy data, comprising the steps of:

presenting, by an analysis processing device including a processor and configured for networked communication, to each baseline population participant via an application instance in network communication with the analysis processing device and configured to interact with that participant, a set of possible outcomes for each of a set of future sporting events, wherein each set of possible outcomes for each future sporting event has at least two possible outcomes;

collecting a set of predictions from each baseline population participant via the application instance, wherein each set of predictions includes, for each future sporting event in the set of future sporting events, one possible outcome selected from the set of possible outcomes for that future sporting event, and wherein an actual outcome of each of the future sporting events is unknown at the time of collecting;

storing, in a Participant Prediction Dataset stored on at least one data storage set in communication with the analysis processing device, the set of predictions from each baseline population participant in association with that baseline population participant;

computing, by the analysis processing device for each future sporting event in the set of future sporting events, at least one outcome support value for each possible outcome of that future sporting event, wherein each outcome support value is based at least in part on a percentage of baseline population participants that selected that possible outcome for that future sporting event;

computing, by the analysis processing device for each baseline population participant, a set of outlier scores comprising an outlier score for each future sporting event, wherein the outlier score for the future sporting event is computed by algorithmically comparing the participant's selected outcome for that future sporting event to the outcome support value for that possible outcome of that future sporting event, whereby the outlier score indicates how well that participant's selection aligned with the selections collected from the baseline population for that future sporting event;

storing each set of outlier scores in the Participant Prediction Dataset in association with that baseline population participant;

determining, by the analysis processing device for each baseline population participant, an outlier index based on the set of outlier scores computed for that participant, wherein the outlier index indicates how well the set of that participant's selections aligned with the selections collected from the baseline population;

curating, by the analysis processing device, an updated population of participants, based at least in part upon a plurality of the outlier indexes comprising applying a weighting value to each of the baseline population participants based at least in part upon a plurality of the outlier indexes, wherein the applied weighting values are lower for participants with the outlier index indicating low alignment with the baseline population and the applied weighting values are higher for baseline population participants with the outlier index indicating high alignment with the baseline population participants; and storing the weighting value in association with each participant on the at least one storage device, wherein the weighting values are accessible by at least one software process for use in generating a statistical group prediction for at least one sporting event of the group of sporting events.

10. The method for curating the optimized population of participants of claim 9, further comprising the step of:

inviting users to participate, wherein the baseline population of participants comprises users who accept the invitation.

11. The method for curating the optimized population of participants of claim 9, further comprising the step of:
collecting, via the application instances, personal information from the baseline population of participants.

12. The method for curating the optimized population of participants of claim 9, further comprising the step of:
selecting, by the analysis processing device after determining the outlier index for each baseline population participant, a sub-population of participants based at least in part on the outlier indexes.

13. The method for curating the optimized population of participants of claim 9, further comprising the step of:
collecting, via the application instances from each participant, at least one quantitative confidence assessment, wherein each confidence assessment represents that participant's confidence in their selected possible outcome for one future sporting event of the set of future sporting events.

14. The method for curating the optimized population of participants of claim 13, further comprising the step of:
weighting at least one outcome support value based on a plurality of the confidence assessments.

15. The method for curating the optimized population of participants of claim 9, further comprising the step of:
collecting, via the application instances for each baseline population participant, a quantitative assessment of that participant's confidence in their knowledge of a specific knowledge category.

16. The method for curating the optimized population of participants of claim 9, further comprising the step of:
after curating the baseline population of participants, participating, by the curated population in real time via the plurality of application instances, in at least one crowd-based or swarm-based prediction session for a future sporting event having at least two outcomes.

17. The system for curating the optimized population of participants of claim 1, wherein the sporting event consists of a first team playing a second team and wherein the set of possible outcomes includes (a) the first team winning, (b) the second team winning, and (c) the sporting event ending in a tie.

18. The method for curating the optimized population of participants of claim 9, wherein the sporting event consists of a first team playing a second team and wherein the set of possible outcomes includes (a) the first team winning, (b) the second team winning, and (c) the sporting event ending in a tie.

\* \* \* \* \*